United States Patent
Lewis

(10) Patent No.: US 11,053,651 B2
(45) Date of Patent: Jul. 6, 2021

(54) LOW-PROFILE FLUID CONDUIT/COLLECTOR AND SYSTEM

(71) Applicant: WATERSHED GEOSYNTHETIC LLC, Alpharetta, GA (US)

(72) Inventor: Delaney Lewis, West Monroe, LA (US)

(73) Assignee: Watershed Geosynthetics LLC, Alpharetta, GA (US)

( * ) Notice: Subject to any disclaimer, the term of this patent is extended or adjusted under 35 U.S.C. 154(b) by 0 days.

(21) Appl. No.: 16/713,727

(22) Filed: Dec. 13, 2019

(65) Prior Publication Data

US 2020/0122208 A1  Apr. 23, 2020

Related U.S. Application Data

(63) Continuation-in-part of application No. 16/190,917, filed on Nov. 14, 2018, now Pat. No. 10,697,145.

(60) Provisional application No. 62/585,586, filed on Nov. 14, 2017.

(51) Int. Cl.
*E02B 11/00* (2006.01)
*B09B 1/00* (2006.01)
*B09B 3/00* (2006.01)

(52) U.S. Cl.
CPC ............ *E02B 11/005* (2013.01); *B09B 1/004* (2013.01); *B09B 1/006* (2013.01); *B09B 3/00* (2013.01); *B32B 2323/04* (2013.01); *E02D 2300/0085* (2013.01)

(58) Field of Classification Search
CPC ...................................... E02B 11/005
See application file for complete search history.

(56) References Cited

U.S. PATENT DOCUMENTS

| 994,155 A | * | 6/1911 | Harris | E02B 11/005 405/43 |
| 3,563,038 A | * | 2/1971 | Healy | E02B 11/005 405/45 |
| 4,057,500 A | * | 11/1977 | Wager | E02B 11/005 210/170.07 |

(Continued)

FOREIGN PATENT DOCUMENTS

| CA | 2154239 | | 1/1997 | |
| CA | 2154239 A1 | * | 1/1997 | ............ E02B 11/005 |

(Continued)

OTHER PUBLICATIONS

International Search Report and Written Opinion of the International Searching Authority for PCT Application No. PCT/US2018/061094, dated Feb. 20, 2019.

*Primary Examiner* — Janine M Kreck
(74) *Attorney, Agent, or Firm* — Gardner Groff & Greenwald, PC.

(57) ABSTRACT

A low-profile fluid collection conduit includes an elongate outer cover having an upper portion and a lower portion generally opposite the upper portion, with the outer cover being much wider than it is tall and defining an interior volume. An elongate rigid spacer is fitted within the interior volume of the elongate outer cover, with the elongate spacer allowing the majority of the interior volume to be unfilled so as to permit the flow of fluid along and within the elongate outer cover. The collection conduit is used with a fluid-impermeable membrane as part of a landfill fluid collection and conveyance system.

25 Claims, 19 Drawing Sheets

(56) References Cited

U.S. PATENT DOCUMENTS

| | | | | |
|---|---|---|---|---|
| 4,182,581 | A | * | 1/1980 | Uehara ................ E02B 11/005 138/103 |
| 4,317,452 | A | | 3/1982 | Russo et al. |
| 4,442,901 | A | * | 4/1984 | Zison .................... E21B 43/305 166/369 |
| 4,596,491 | A | * | 6/1986 | Dietzler .................... F16L 9/18 405/154.1 |
| 5,458,436 | A | * | 10/1995 | Plowman ................ E01C 13/02 405/36 |
| 5,634,741 | A | * | 6/1997 | Tremblay .............. E02B 11/005 24/462 |
| 6,065,901 | A | * | 5/2000 | Stevens .................. E02D 31/00 405/128.15 |
| 6,280,117 | B1 | | 8/2001 | Obermeyer et al. |
| 8,162,567 | B2 | * | 4/2012 | Obermeyer ............ E03F 1/002 405/50 |
| 8,777,515 | B1 | * | 7/2014 | Donlin ................ E02B 11/005 405/45 |
| 10,697,145 | B2 | * | 6/2020 | Lewis .................... B09C 1/005 |
| 2004/0062610 | A1 | * | 4/2004 | Hater ...................... B09B 1/00 405/129.95 |
| 2005/0269253 | A1 | | 12/2005 | Potts |

FOREIGN PATENT DOCUMENTS

| | | | | |
|---|---|---|---|---|
| DE | 1902919 | A1 * | 9/1969 | ........... E01C 13/083 |
| DE | 19703826 | | 8/1998 | |
| DE | 19703826 | A1 * | 8/1998 | ............ E02B 11/005 |
| EP | 0075993 | | 4/1983 | |

* cited by examiner

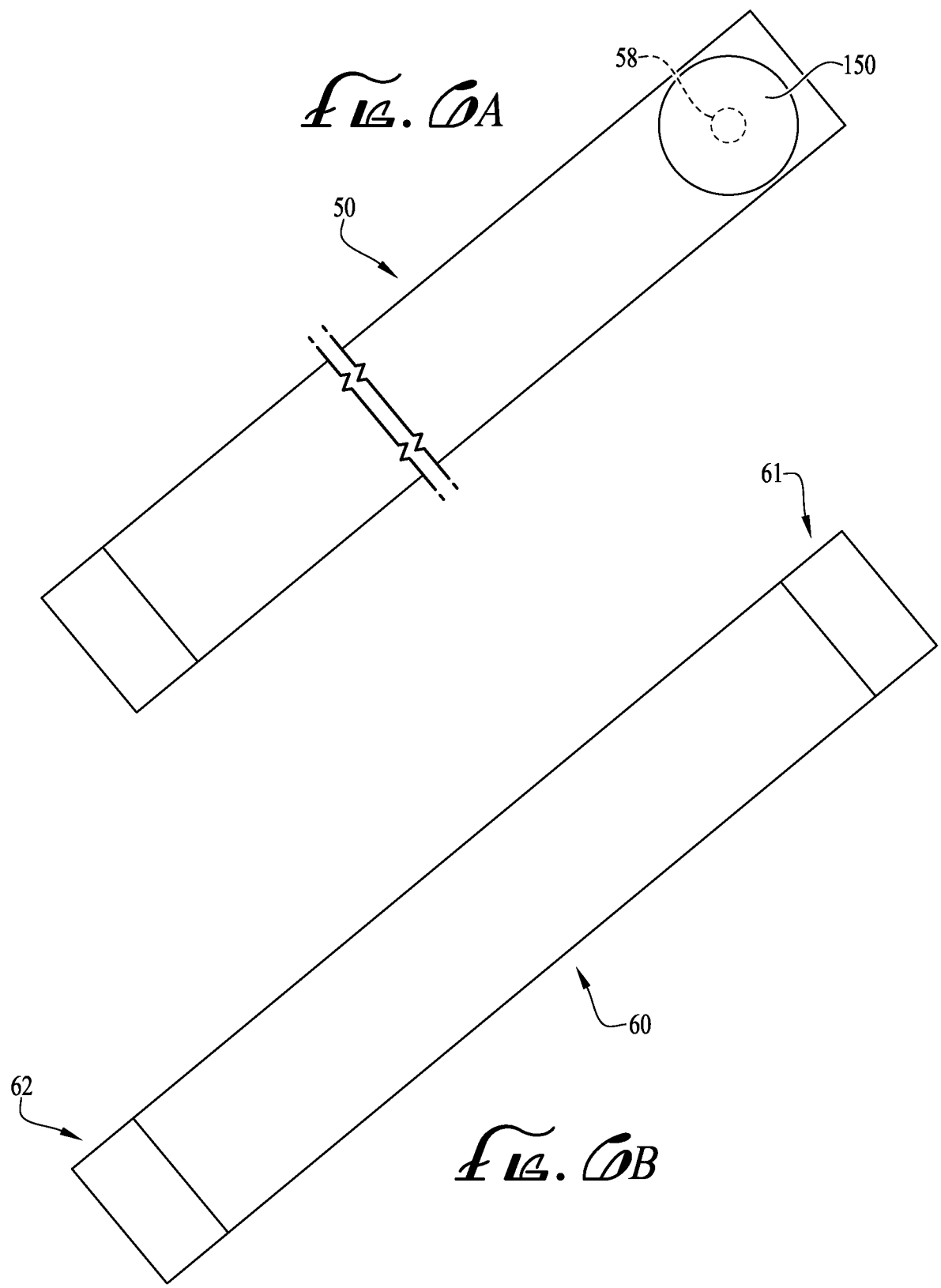

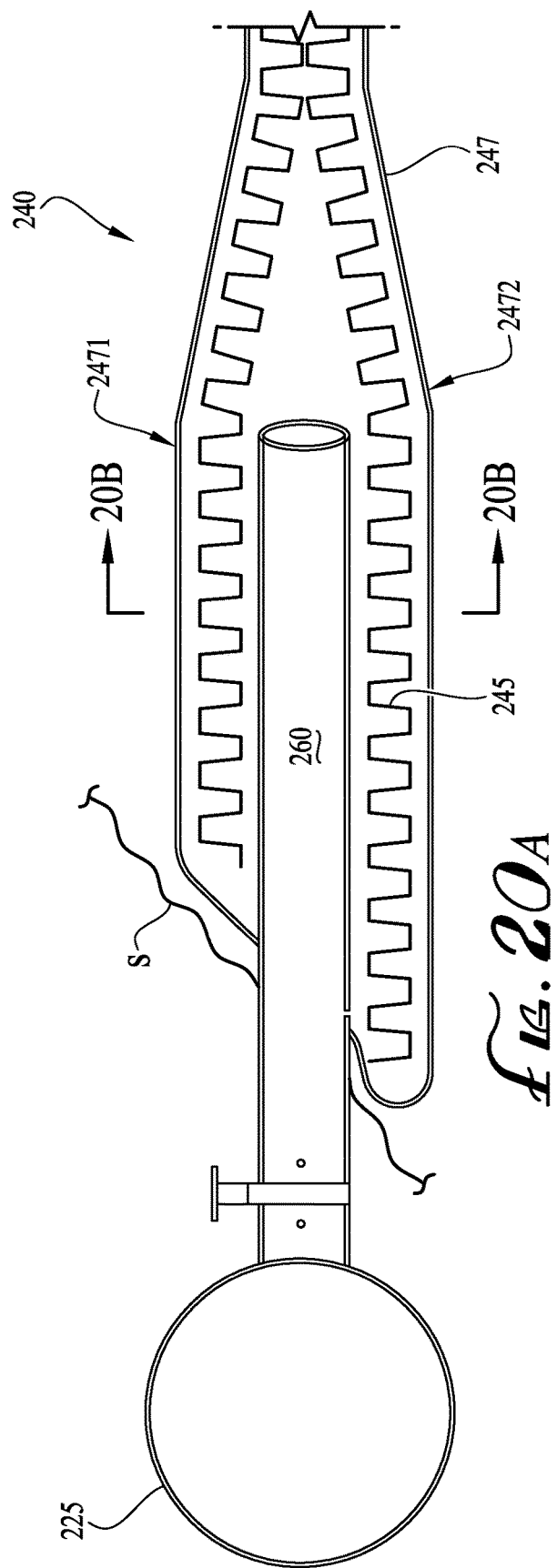
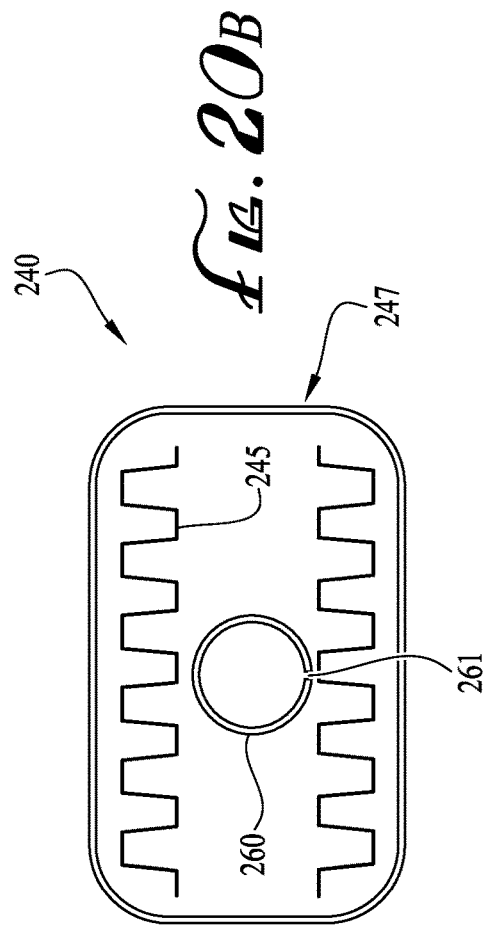

LOW-PROFILE FLUID CONDUIT/COLLECTOR AND SYSTEM

CROSS-REFERENCE TO RELATED APPLICATION

This application is a continuation-in-part of U.S. Non-Provisional patent application Ser. No. 16/190,917 filed on Nov. 14, 2018, which claims the benefit of U.S. Provisional Patent Application Ser. No. 62/585,586 filed on Nov. 14, 2017, the entirety of which is hereby incorporated herein by reference for all purposes.

BACKGROUND

Technical Field

In many instances, a fluid needs to be moved over a large distance or collected over a large area. For example, as waste material decomposes in a landfill, it gives off various gases. In the past, it has been known to use pumps, piping, and wellheads to extract the gases from the landfill and collect the same. Such wellheads are often spaced about one per acre in a grid pattern. Such systems of collecting the gases can be shut down by many factors, including power failures. To prevent the undesirable build-up of such gases in the event of non-operation of the extraction system, it has often been known to employ a grid pattern of vents spaced between the extraction wellheads, often at the same one per acre density.

As described in published U.S. Patent Application Number 20060034664, conventional gas extraction wells at landfills often involve deep wells attached to a network of pipes and a gas pump (blower) that applies vacuum (negative pressure) to extract the gas from the stored waste as the waste decomposes.

A prior art arrangement according to the above published patent application is shown in FIG. 1. Landfill 1 containing waste 2 generates biogas (biogas flows shown by the arrows). Biogas is collected and extracted through a well 3. The well 3 includes a gas-collecting well screen 16 and a gas-impermeable conduit 17 linking the well screen to the surface to draw biogas from the wellhead to the surface. Overlaying the majority of the waste 2 is a gas-permeable layer 5. The term "wellhead" refers to a portion of the gas-extraction well from which gas can be extracted. The well often includes a section of pipe having slots or other gas-flow apertures cut in it, referred to as a "well screen". Often, the well screen is also surrounded with gravel.

The gas-permeable layer is typically composed of a conductive porous matrix with gas flow paths. Often it is composed of rigid or semi-rigid particles of a large enough size to leave a significant void volume between particles. For instance, the gas-permeable layer may contain sand, gravel, wood chips, or shredded tires. Above the gas-permeable layer is a gas-containment layer 7. Biogas that rises from the landfill reaches the gas-permeable layer where it is trapped by the overlying gas-containment layer 7. The biogas migrates horizontally in the gas-permeable layer until it comes close to a well. Gas extraction from the well creates a vacuum that draws gas into the well. This vacuum draws biogas from the overlying gas-permeable layer down through the waste mass of the landfill to reach the well.

The area immediately beneath the gas-permeable high conductivity layer 5 through which a substantial fraction of the biogas from the gas-permeable layer passes as it travels to the gas-collection wellhead is the entrainment zone 9. On its passage through the waste 2, the gas from the gas-permeable layer mixes with biogas produced in the waste mass that has not gone through the gas-permeable layer. This helps to give a consistent content to the biogas that is withdrawn from the well. If gas is withdrawn directly from the gas-permeable conductive layer, the gas composition will vary more dramatically over time, sometimes containing a high air content and sometimes not. It is sometimes desirable to place an even more impermeable layer, such as geomembrane 15, directly over the zone of entrainment of gas from the permeable layer that is created by the deep well. Moreover, sometimes the entire landfill is covered with such a membrane.

FIG. 2 shows another prior art arrangement, this time showing a more shallow wellhead 26 used to withdraw near-surface or sub-surface gas from beneath a membrane M capping a waste W. The wellhead 26 is attached to an above-ground conduit by way of a vertical pipe.

FIG. 3 shows another prior art arrangement, this time depicting a landfill with multiple wellheads 30 used to withdraw near-surface or sub-surface gas from beneath the surface. The wellheads 30 are attached to an above-ground vent 31.

FIG. 4 shows another prior art arrangement similar to that in FIG. 2, this time showing a field of wellheads 40 spaced to extract the gases from a landfill and collect the same. Such wellheads are often spaced about one per acre.

SUMMARY OF THE INVENTION

In an example form, the invention relates to a low-profile fluid collection conduit, such as for use at landfills and the like. In one example, the fluid collection conduit includes an elongate outer cover having an upper portion and a lower portion generally opposite the upper portion, with the outer cover being much wider than it is tall and defining an interior volume. A rigid spacer is fitted within the interior volume of the elongate outer cover, with the spacer allowing the majority of the interior volume to be unfilled so as to permit the flow of fluid along and within the elongate outer cover.

Optionally, the elongate outer cover is non-perforated. Alternatively, the elongate outer cover can be perforated.

Preferably, the elongate outer cover is much thinner than it is tall and is flexible. Preferably, the elongate outer cover is made from one or more polymers.

Preferably, the elongate outer cover has an aspect ratio of width to height of more than 10:1. More preferably, the elongate outer cover has an aspect ratio of width to height of more than 20:1. In a preferred example, the elongate outer cover has an aspect ratio of width to height of more than 50:1.

Optionally, the elongate outer cover has a height of between about ½ inch and about 3 inches. More preferably, the elongate outer cover has a height of about one inch. Optionally, the elongate cover can have a width of between about one foot and about 8 feet.

In another example form, the present invention relates to a low-profile subsurface fluid conveyance conduit grid. The fluid conveyance grid includes at least one high-volume, low-profile fluid trunk conduit. It also includes at least two medium-volume, low-profile fluid branch conduits connected to and feeding into the at least one high-volume, low profile trunk conduit. Further, it includes at least four lower-volume, low-profile collector conduits connected to and feeding into the at least two medium-volume, low profile branch conduits, with each branch conduit being connected to at least two of the collector conduits. With this construction, surficial fluid can be drawn into the smaller collector conduits, gathered into the somewhat larger branch conduits, and finally into the trunk conduit. At least one of the trunk conduit, the branch conduits, and the collector conduits includes an elongate outer cover having an upper portion and a lower portion generally opposite the upper portion, with the outer cover being much wider than it is tall and defining an interior volume and including an elongate rigid spacer fitted within the interior volume of the elongate outer cover, the elongate spacer allowing the majority of the interior volume to be unfilled so as to permit the flow of fluid along and within the elongate outer cover.

Optionally, the fluid conveyed within the conveyance conduit grid includes at least some water. Optionally, the fluid includes surficial landfill gas.

Optionally, the grid is adapted for use under the surface of a landfill, with the grid further comprising an impermeable membrane positioned under the surface of the landfill and over the conduits.

Preferably, the grid is substantially cruciform in shape and at intersections of various conduits an adapter T or cross is provided. Optionally, the adapter T or cross has an upper opening and is provided with a cover for covering the upper opening.

Preferably, the grid includes at least one trunk conduit and the at least two branch conduits each comprise an elongate, non-perforated outer cover. Optionally, the at least four collector conduits each comprise an elongate perforated outer cover.

Preferably, the elongate outer cover comprises a polymer.

Preferably, the collector conduits have an aspect ratio of width to height of more than 10:1. More preferably, the aspect ratio is more than 20:1. Indeed, even an aspect ratio of more than 50:1 can be achieved.

BRIEF DESCRIPTION OF THE DRAWING FIGURES

FIG. 6A is a schematic, sectional view of a low-profile fluid collection conduit for extracting and/or conveying sub-surface gas from a waste landfill according to a preferred example form of the present invention.

FIG. 6B is a schematic plan view of a conduit of the present invention.

FIG. 20A is a schematic, sectional view of a transitional connector for connecting the low-profile fluid collection conduit and system of FIG. 15 to a main header.

FIG. 20B is a schematic, sectional view of the transitional connector of FIG. 20A, taken along the lines B-B.

DESCRIPTION OF EXAMPLE EMBODIMENTS

In an example form, the invention relates to a low-profile fluid collection or conveyance conduit, such as for use at landfills and the like. In another example form, the present invention relates to a low-profile subsurface fluid conveyance conduit grid. Examples of these follow.

A Low-Profile Fluid Conduit and/or Collector and Related Components

In one example form, the present invention relates to a sub-surface collection or conveyance fluid conduit 50 for collecting and/or conveying sub-surface gas and the like from near the surface of landfills, typically for use with a geomembrane for capping a waste field. The geomembrane is generally impermeable to fluids in order to contain or cap the waste below, and thereby restrict the sub-surface gas from flowing into the atmosphere and to restrict atmospheric air from flowing into the waste below the geomembrane.

Figure 1:
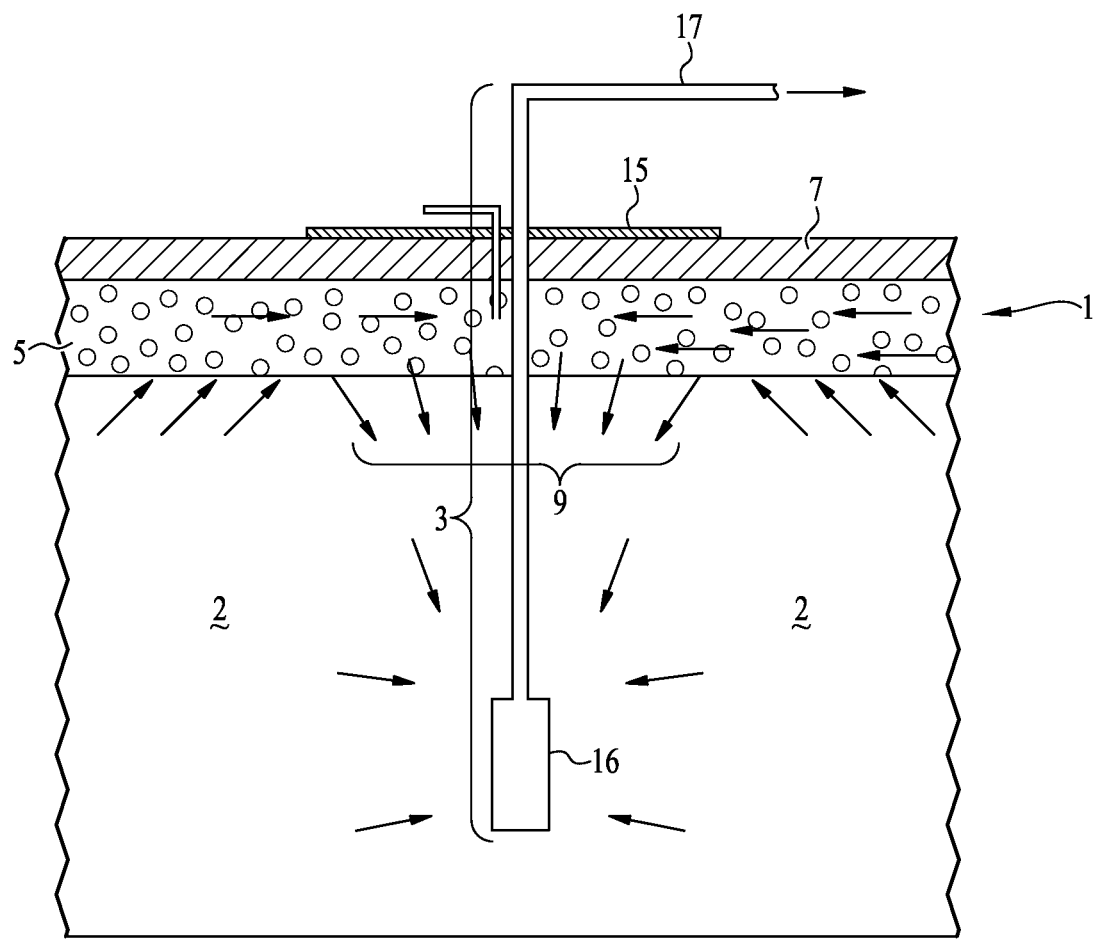
FIG. 1 is a schematic illustration of a first prior art wellhead for extracting sub-surface gas from a waste landfill.
Figure 2:
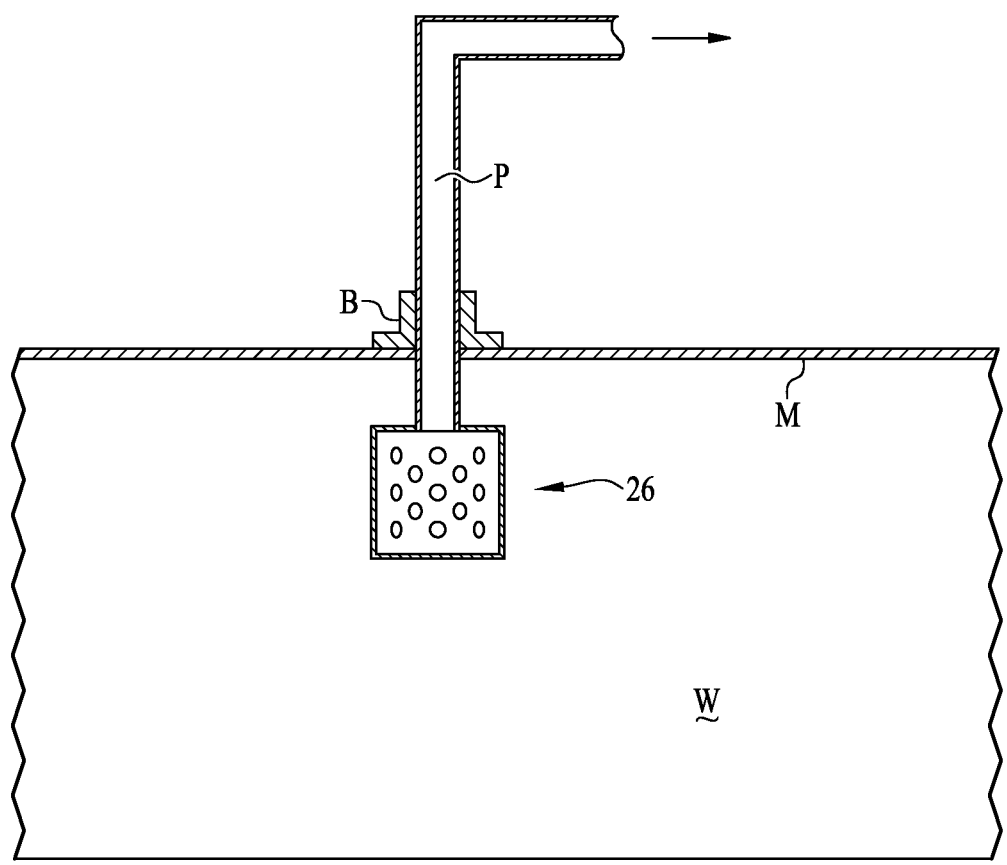
FIG. 2 is a schematic illustration of a second prior art wellhead for extracting sub-surface gas from a waste landfill.
Figure 3:
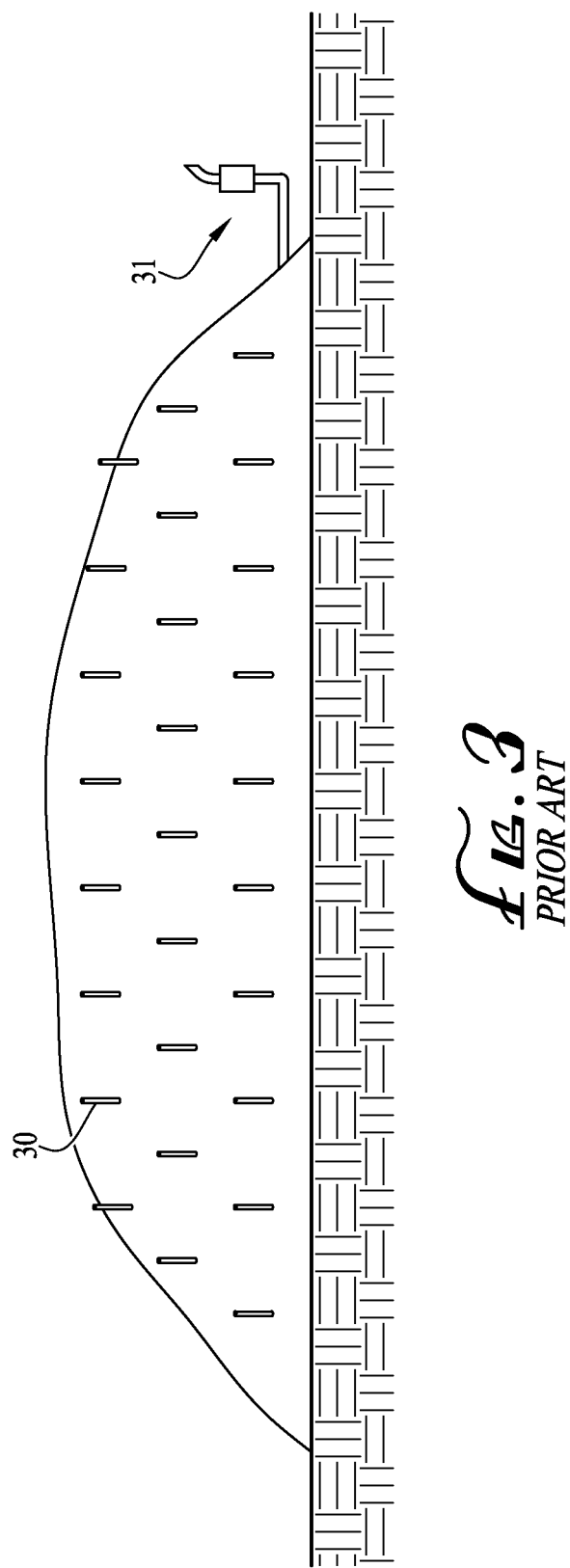
FIG. 3 is a schematic illustration of a prior art waste landfill with multiple wellheads for extracting sub-surface gas from a waste landfill.
Figure 4:
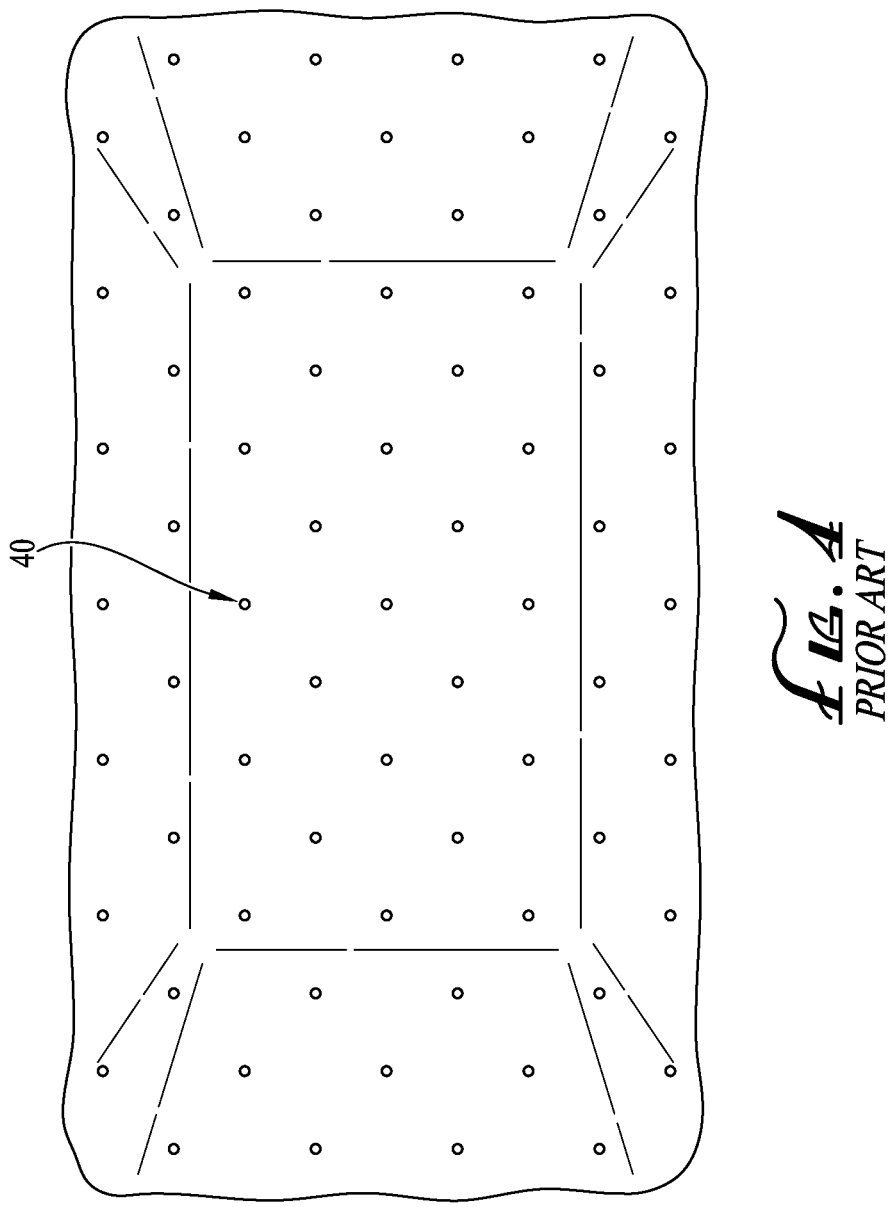
FIG. 4 is a schematic illustration of a prior art waste landfill with multiple wellheads for extracting sub-surface gas from a waste landfill.
Figure 5A:
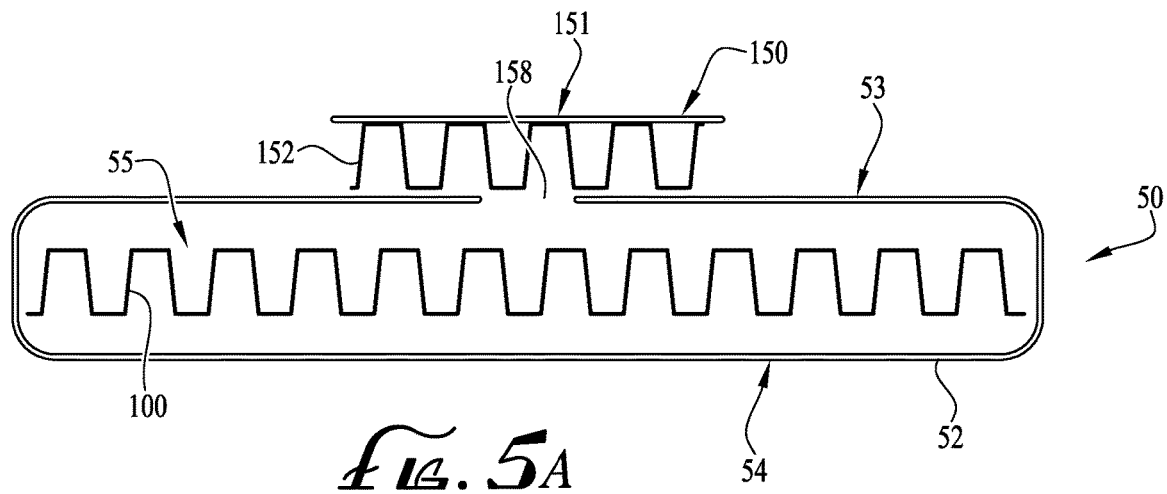
FIG. 5A is a schematic, sectional view of a low-profile fluid collection conduit for extracting and/or conveying sub-surface gas from a waste landfill according to a preferred example form of the present invention.

FIG. 5A is a schematic, sectional view of the conduit 50 for extracting and/or conveying sub-surface gas from a waste landfill according to a preferred example embodiment of the present invention. The conduit 50 includes a generally box-like outer casing 52 forming an enclosure with a substantially flat upper portion 53, a flat lower portion 54, and defining an interior volume 55. The casing 52 can include, or not include, perforations formed therein to provide for the admission of sub-surface gas into the interior volume, as desired. Preferably, the outer casing 52 comprises a fluid-impermeable membrane and the interior volume 55 provides an inner gas or fluid flow channel. Optionally, an upper orifice or inlet opening 58 is formed in the upper portion 53 of the enclosure or casing 52.

Preferably, the outer casing 52 is thin, and forms a conduit with a large aspect ratio of width to height. Also, the conduit 50 is adapted to be quite long and the interior volume is supported and maintained with the aid of a reinforcement corrugation 100. The corrugation 100 serves to provide structural rigidity and integrity against collapse, in order to maintain an open flow volume, despite forces that may otherwise tend to crush the casing 52.

Thus, in one form the low-profile fluid collection conduit 50 is adapted for use at landfills and the like. In one example, the fluid collection conduit 50 includes an elongate outer cover 52 having an upper portion 53 and a lower portion 54 generally opposite the upper portion, with the outer cover 52 being much wider than it is tall and defining an interior volume 55. An elongate rigid spacer 100 is fitted within the interior volume 55 of the elongate outer cover 52, with the elongate spacer 100 allowing the majority of the interior volume 55 to be unfilled so as to permit the flow of fluid along and within the elongate outer cover 52.

Figure 5B:
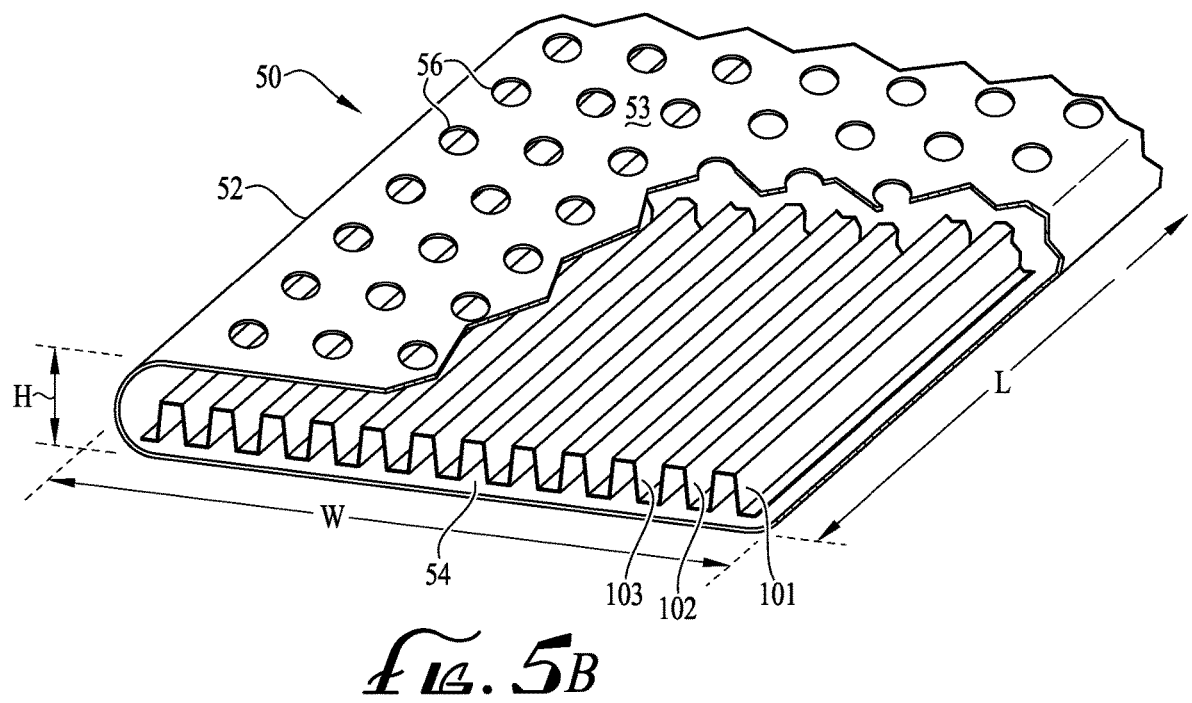
FIG. 5B is a schematic, perspective, partially cut-away view of a low-profile fluid collection conduit of FIG. 5A for extracting and/or conveying sub-surface gas from a waste landfill according to a preferred example form of the present invention.

Optionally, the elongate outer cover 52 is non-perforated. Alternatively, the elongate outer cover 52 can be perforated (see perforations 56 in cover 52 as depicted in FIG. 5B).

Preferably, the elongate outer cover 52 is much thinner than it is tall and is flexible. Preferably, the elongate outer cover is made from one or more polymers.

Preferably, the elongate outer cover 52 has an aspect ratio of width to height of more than 10:1. More preferably, the elongate outer cover 52 has an aspect ratio of width to height of more than 20:1. In a preferred example, the elongate outer cover 52 has an aspect ratio of width to height of more than 50:1.

Optionally, the elongate outer cover 52 has a height of between about ½ inch and about 3 inches. More preferably, the elongate outer cover has a height of about one inch. Optionally, the elongate cover 50 can have a width of between about one foot and about 8 feet. So for example, the cover 50 can be a foot wide, two feet wide, 3.5 feet wide, 4 feet wide, 6 feet wide, etc.

While the outer cover 52 can be made of flexible or rigid materials, the spacer 100 should be sufficiently rigid to maintain the shape of the conduit 50. The conduit 50 can be made much longer than the spacer 100 such that several or many such spacers 100 are employed along the length of the conduit 50. By using many spacers 100 of shorter lengths than the conduit 50, the conduit can be assembled with the spacers inside of it and then rolled up for convenient transport. The rolled-up assembly then can be unrolled at the installation site. The rigid spacer 100 can be made as long as the conduit 50, but at the expense of decreasing the flexibility of the assembly, making rolling it up for transport and unrolling it at the jobsite more difficult or impractical.

Preferably, a collection disk or cover 150 is provided over the aperture or opening 58 for shrouding the orifice/opening against becoming clogged with debris. The collection disk 150 is formed similarly to the conduit 50, with a thin upper covering 151 and a rigid spacer 152 supporting the thin upper cover 151. In this way, the thin upper cover 151 can be fabricated as a flexible element or as a rigid element, as desired.

FIG. 5B is a schematic, perspective, partially cut-away view of a low-profile fluid collection conduit of FIG. 5A for extracting and/or conveying sub-surface gas from a waste landfill according to a preferred example form of the present invention. As shown in this example, the fluid collection conduit 50 includes an elongate outer cover 52 having an upper portion 53 and a lower portion 54 generally opposite the upper portion. The outer cover 52 has a width W which is much wider than the height H of the cover 52. The aspect ratio between the width and the height is on the order of a magnitude and can even be approach two orders of magnitude. As noted earlier, the length L can be hundreds of feet. The elongate rigid spacer 100 fitted within the interior volume of the elongate outer cover 52 in this example takes the form of an elongate ribbed element, with ribs 101, 102, 103, etc., extending upwardly from a base plate or substrate 110, with the elongate spacer 100 allowing the majority of the interior volume 55 to be unfilled so as to permit the flow of fluid along and within the elongate outer cover 52. The ribs can be hollow or can be solid, as desired. As shown in this figure, the cover 52 can be provided with a large number of perforations, such as perforations 56 to allow gas/fluids to be drawn into the interior volume 55.

Figure 5C:
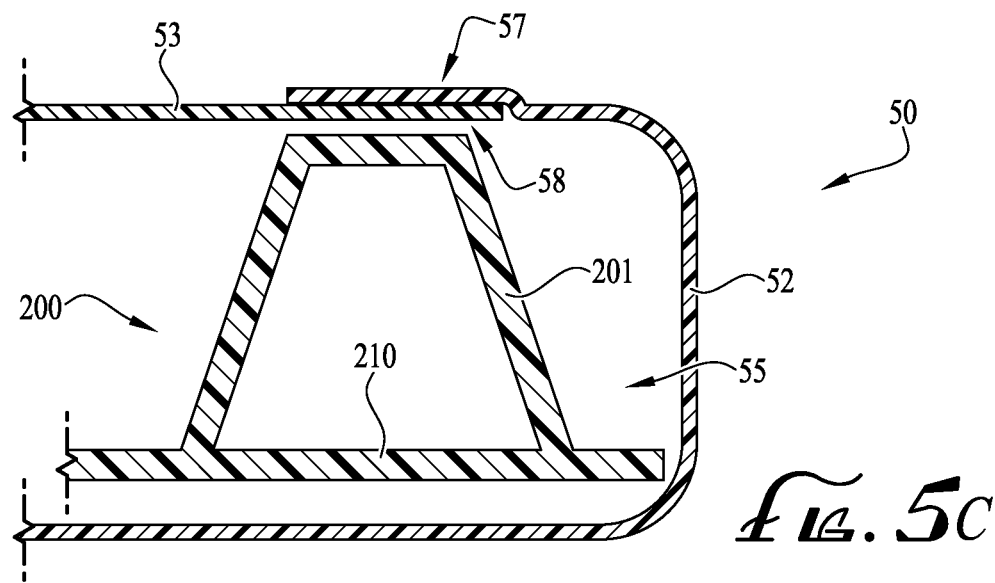
FIG. 5C is a schematic, sectional view of a low-profile fluid collection conduit of FIG. 5A for extracting and/or conveying sub-surface gas from a waste landfill according to another preferred example form of the present invention.

FIG. 5C is a schematic, sectional view of a low-profile fluid collection conduit of FIG. 5A for extracting and/or conveying sub-surface gas from a waste landfill according to another preferred example form of the present invention. In this example, the elongate rigid spacer 200 fitted within the interior volume of the elongate outer cover 52 in this example takes the form of an elongate dimpled element, with dimples or cones, such as cone 201, extending upwardly from a base plate or substrate 210, with the elongate spacer 100 allowing the majority of the interior volume 55 to be unfilled so as to permit the flow of fluid along and within the elongate outer cover 52. The cones, such as cone 201, are frusto-conical in shape. But a wide variety of shapes can be employed, such as hemispherical nubs, cylinders, pyramids, etc.

Figure 5D:
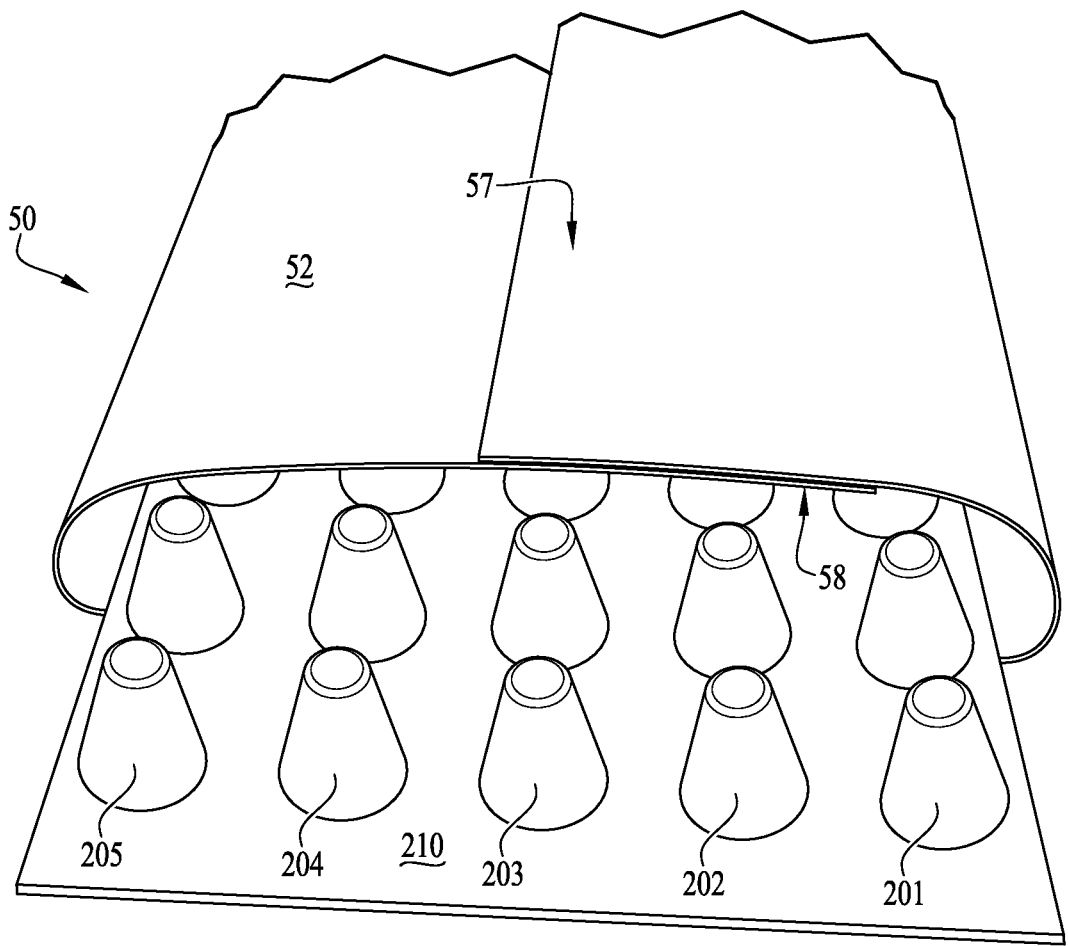
FIG. 5D is a schematic, perspective, partially cut-away view of a low-profile fluid collection conduit of FIG. 5C for extracting and/or conveying sub-surface gas from a waste landfill according to another preferred example form of the present invention.

FIG. 5D is a schematic, perspective, partially cut-away view of a low-profile fluid collection conduit of FIG. 5C for extracting and/or conveying sub-surface gas from a waste landfill according to another preferred example form of the present invention. In this example the cones can be seen to include a large number of cones, including cones 201, 202, 203, 204, 205, etc., extending upwardly from the base plate or substrate 210.

FIG. 5C and FIG. 5D show how the first end portion 57 of the cover 52 overlies and abuts the opposite (second) end portion 58 of the cover 52. Indeed, these two end portions are secured to one another, as by heat bonding, adhesives, chemical bonding, etc.

FIG. 6A shows the conduit 50 in a plan view with a gas collection disk 150 thereupon positioned over a gas aperture 58. As depicted rather schematically, the length of the conduit 50 can be on the order of 200 feet, while the width of the conduit 50 would typically be on the order of 1 foot. The collection disk 150 is a low profile, high gas flow capacity structure. The collection disk 150 is generally a 4 inch (round or square) diameter and is placed over the collection orifice 58 to ensure gas flow into the system.

Preferably, the components of this rather flat pipe/conduit provide a gas collection lateral which is a low profile (flat pipe) high gas flow capacity structure encased within an impermeable membrane (hdpe, llpe, pvc, etc. . . . ). The unit is utilized as both a gas conveyance and collection point. The gas collection lateral is generally, but not necessarily, 200 ft. in length with a 1 inch height and widths from 1 to 2 foot. The lateral is sealed on one end with an orifice cut into the membrane and a collection disk placed over the orifice to ensure gas flow into the orifice and lateral. The body of the lateral can be fluid-impermeable with a collection orifice on one end and an opening on the other for installation into a reducer tee.

FIG. 6B shows a straight run section of conduit which can be inserted into a reducer tee at one end 61 and into a reducer tee or a pipe transition at the opposite end 62. This can be a low profile, high gas flow capacity structure encased within an impermeable membrane (hdpe, llpe, pvc, etc) and utilized for gas conveyance from one point (such as a reducer tee) to another. The sub-header (flat conduit) is generally 200 ft. in length with a 1 inch height and varying widths (8', 6.5', 4' and 2') depending upon gas flow capacity design requirements for the specific section of sub-header. Of course, these dimensions can be varied as desired. But such a structure allows for these advantageous dimensions in which a long run conduit can be very wide, very short in height and very long in length. While the body of the sub-header (flat pipe) is generally impermeable, the ends are left open for installation into the reducer tee.

Figure 7A:
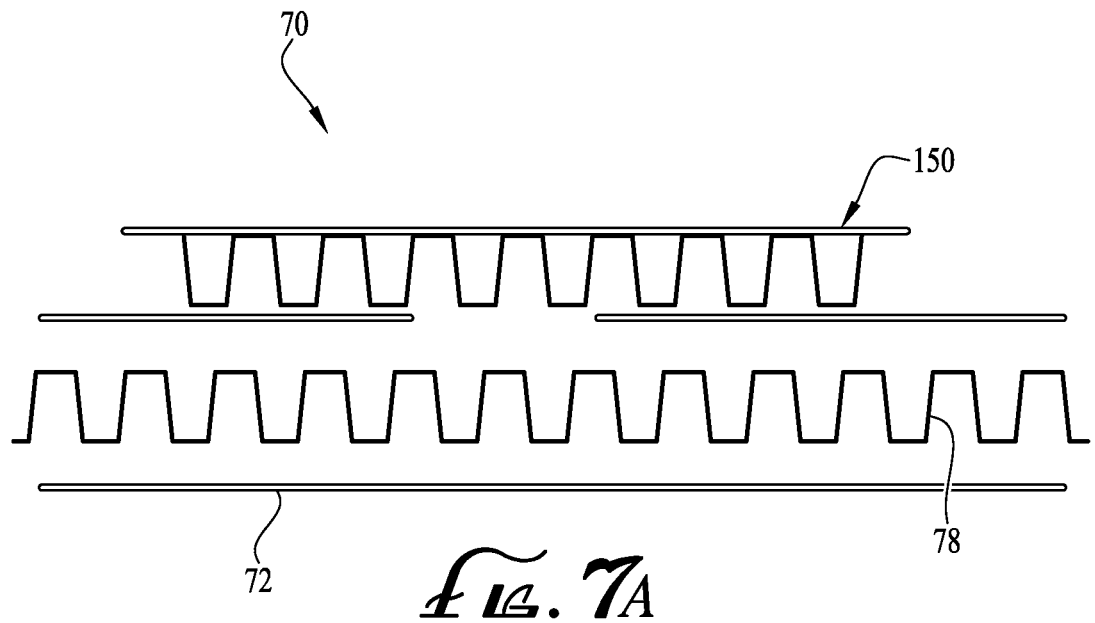
FIGS. 7A and 7B are schematic, sectional and plan views of a junction connector for connecting conduits in a cruciform pattern.
Figure 7B:
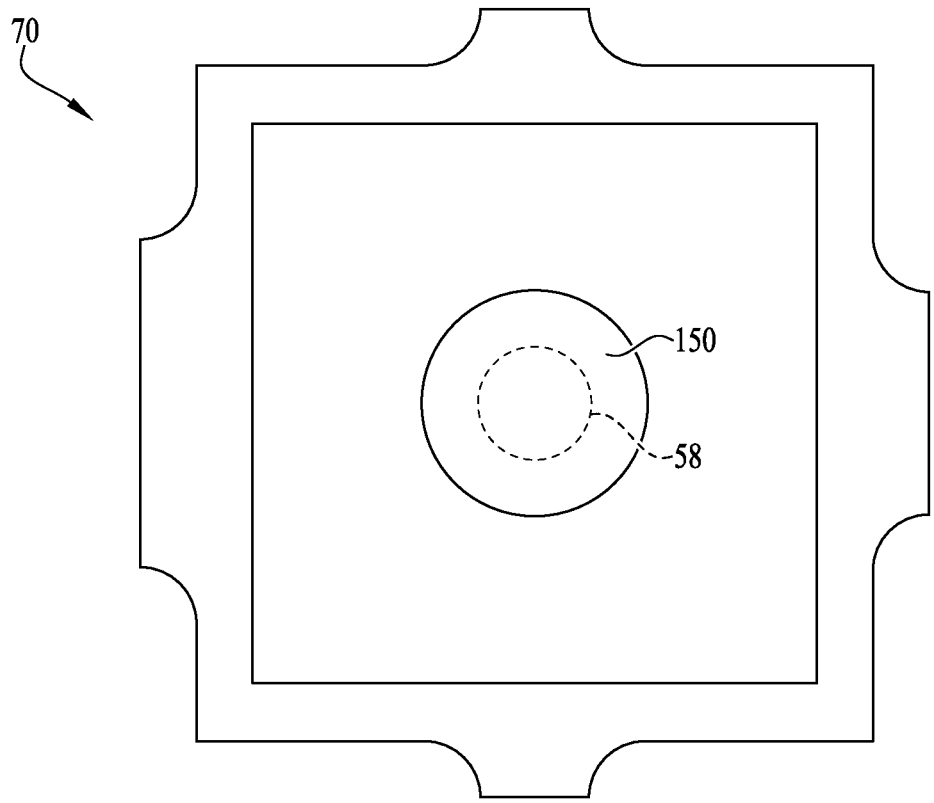
Figure 8:
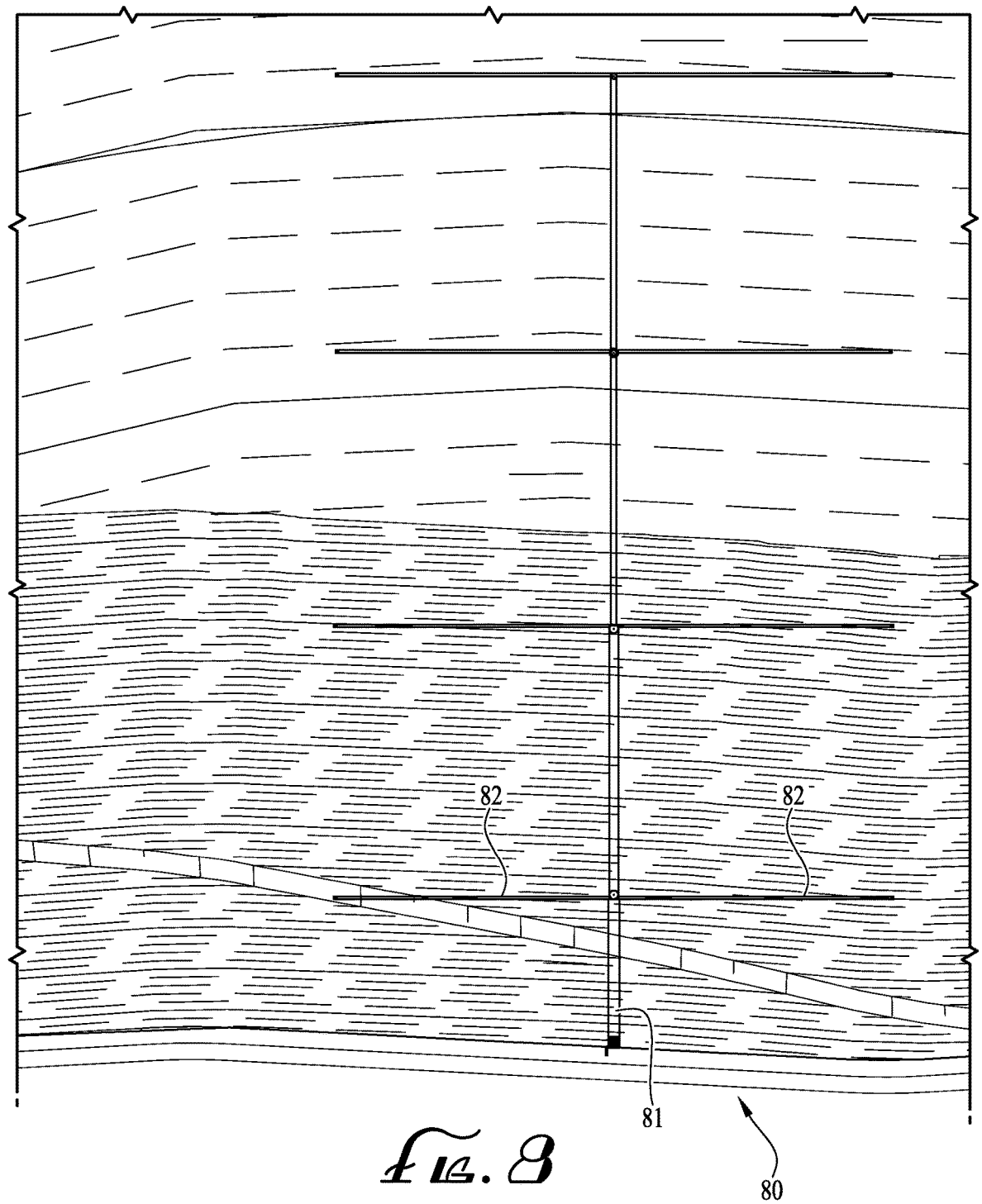
FIG. 8 is a schematic view of a collection and conveyance grid for extracting and/or conveying sub-surface gas from a waste landfill.
Figure 9:
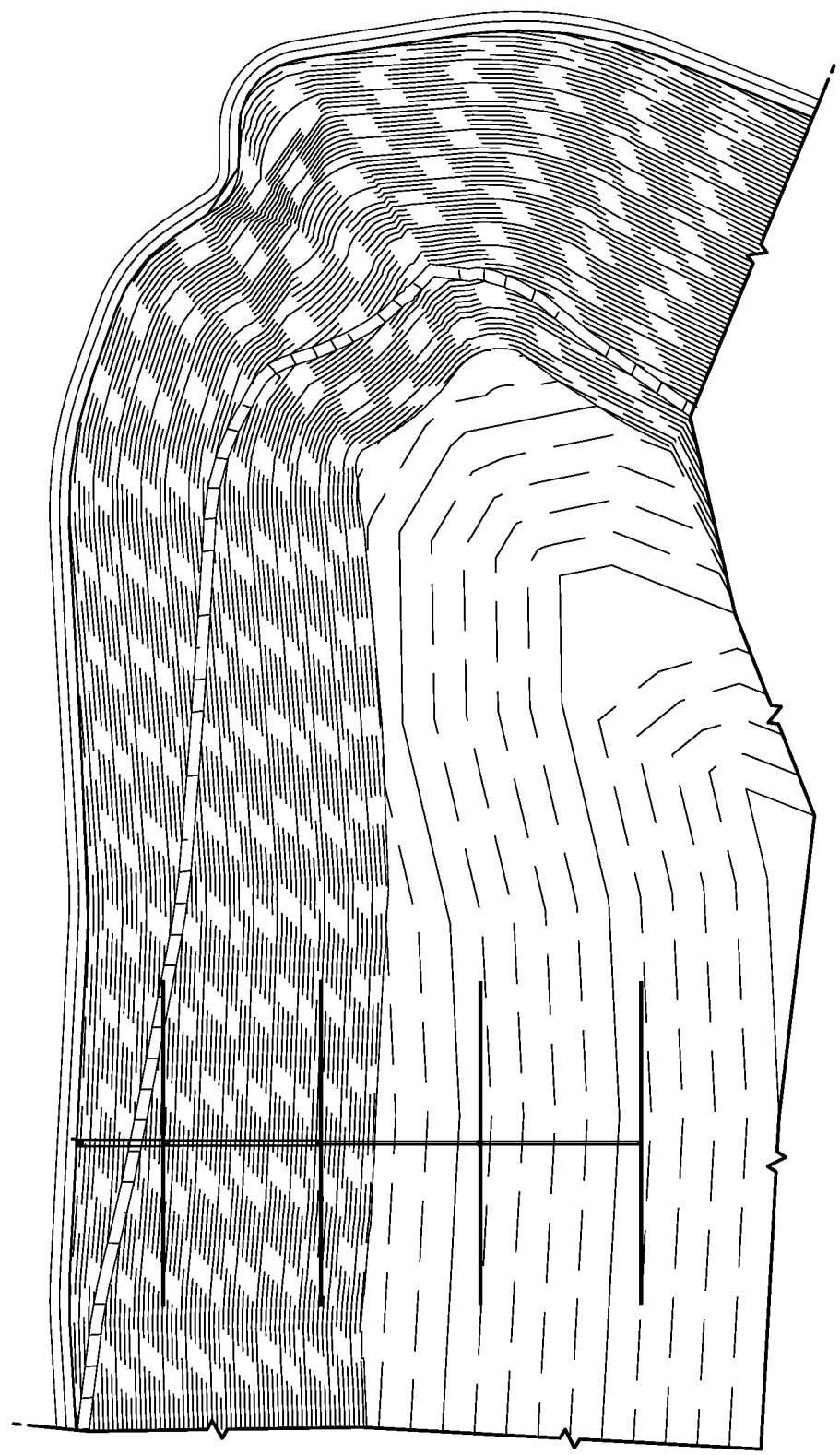
FIG. 9 is a schematic view of the collection and conveyance grid for extracting and/or conveying sub-surface gas from a waste landfill of FIG. 8, shown in conjunction with a three-dimensional landfill site.
Figure 10:
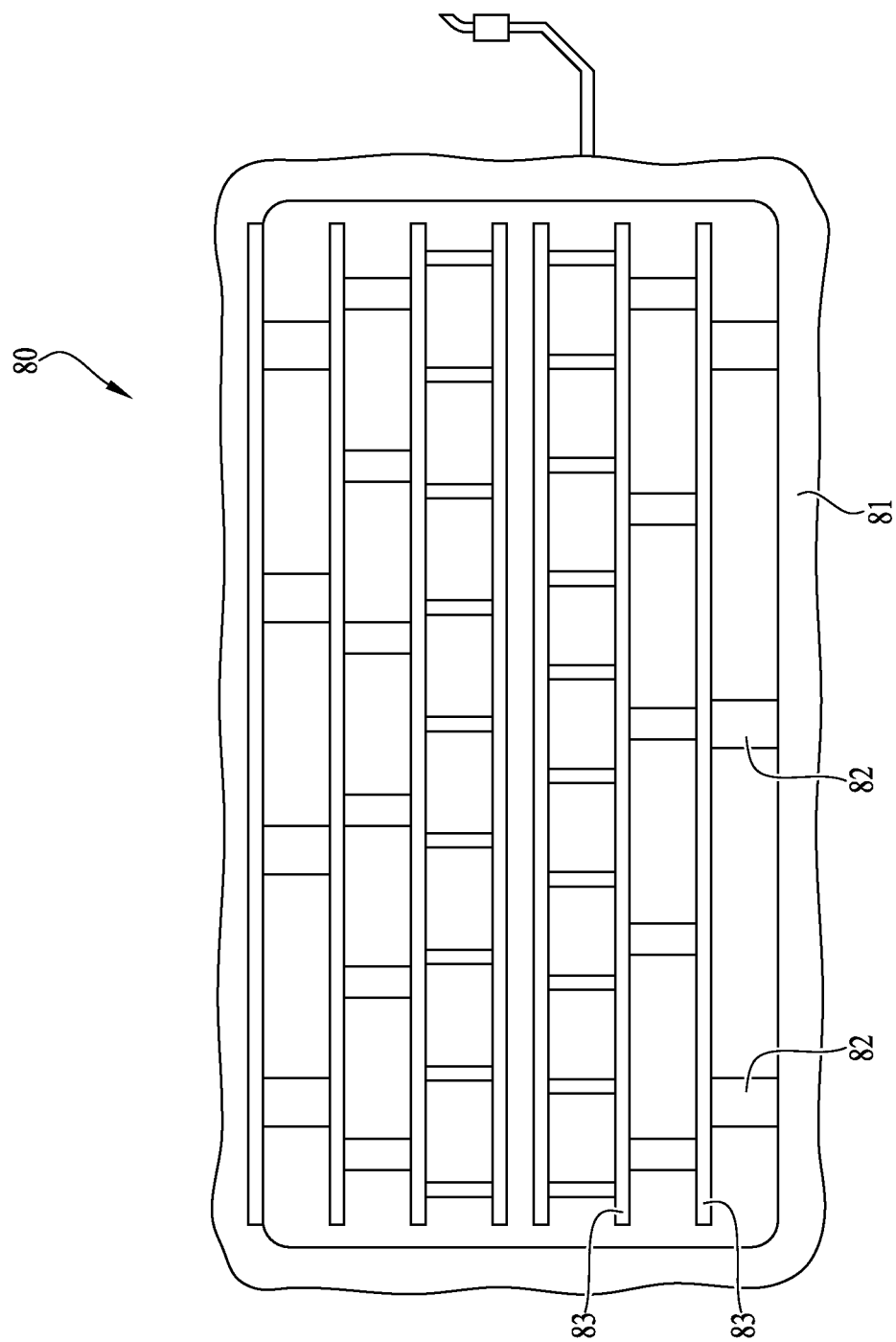
FIG. 10 is a schematic view of another example collection and conveyance grid for extracting and/or conveying sub-surface gas from a waste landfill.
Figure 11:
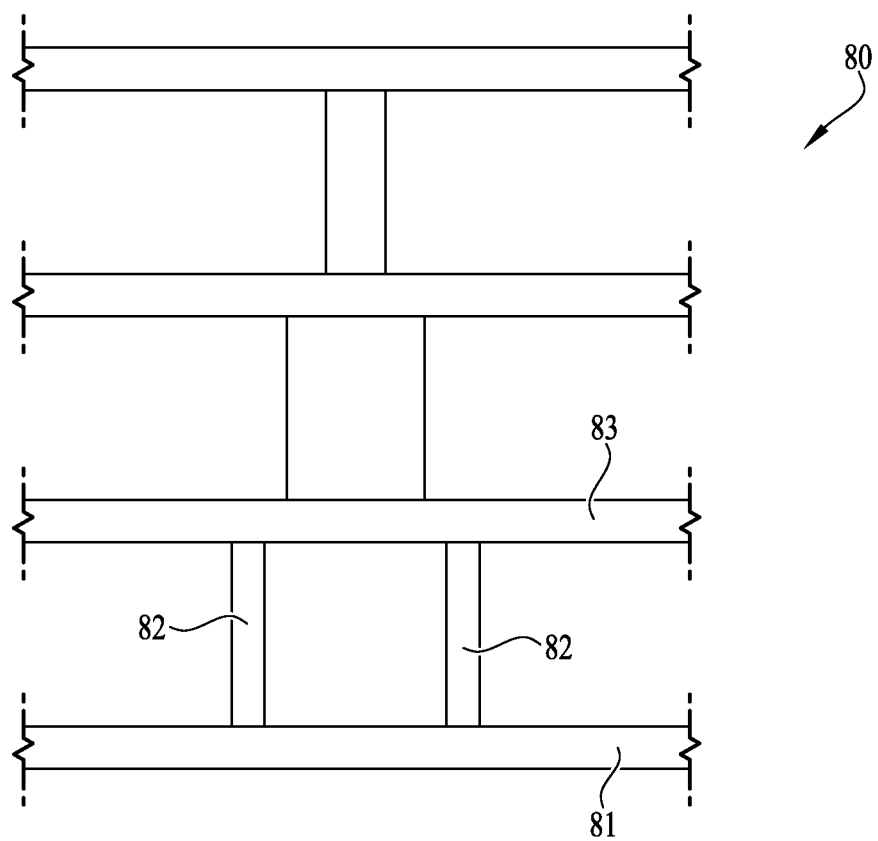
FIG. 11 is a schematic view of a portion of the example collection and conveyance grid of FIG. 10.

FIGS. 7A and 7B are schematic, sectional and plan views of a junction connector for connecting conduits in a cruciform pattern. This junction connector 70 comprises a reducer tee as a low profile, high gas flow capacity structure (spacer 78) encased within an impermeable membrane 72 (hdpe, llpe, pvc, etc.) and utilized as both a gas collection point and an intersecting point between sub-headers 50 and Gas collection laterals 60. The reducer tee 70 in an example form is 1 inch in height and designed to receive two gas laterals (1 to 2 ft in width) along with one or two gas collection sub-headers. Each reducer tee is sized according to the subheader width requirements (flow capacity design) for the specific location in the field.

The above-described components can be assembled and secured to one another by being welded, glued, taped, clamped or otherwise physically attached to one another, or by other means.

The sub-surface gas to be collected and withdrawn with the present invention can be any of several sub-surface gases, such as natural gas. The fluid collected and conveyed can be gaseous or liquid.

A Low-Profile Subsurface Fluid Conveyance or Collection Conduit Grid

In another example form as shown in FIGS. 8-11, the present invention relates to a low-profile subsurface fluid conveyance conduit grid 80. The fluid conveyance grid includes at least one high-volume, low-profile fluid trunk conduit 81. It also includes at least two medium-volume, low-profile fluid branch conduits 82 connected to and feeding into the at least one high-volume, low profile trunk conduit 81. Further, it includes at least four lower-volume, low-profile collector conduits 83 connected to and feeding into the at least two medium-volume, low profile branch conduits 82, with each branch conduit 82 being connected to at least two of the collector conduits 83. With this construction, surficial fluid can be drawn into the smaller collector conduits 83, gathered into the somewhat larger branch conduits 82, and finally into the trunk conduit 81.

At least one of the trunk conduit 81, the branch conduits 82, and the collector conduits 83 includes an elongate outer cover having an upper portion and a lower portion generally opposite the upper portion, with the outer cover being much wider than it is tall and defining an interior volume and including an elongate rigid spacer fitted within the interior volume of the elongate outer cover, the elongate spacer allowing the majority of the interior volume to be unfilled so as to permit the flow of fluid along and within the elongate outer cover.

Optionally, the fluid conveyed within the conveyance conduit grid includes at least some water. Optionally, the fluid includes surficial landfill gas. Optionally, the grid is adapted for use under the surface of a landfill, with the grid further comprising an impermeable membrane positioned under the surface of the landfill and over the conduits.

Preferably, the grid is substantially cruciform in shape and at intersections of various conduits an adapter T or cross is provided. Optionally, the adapter T or cross has an upper opening and is provided with a cover for covering the upper opening.

Preferably, the grid includes at least one trunk conduit and the at least two branch conduits each comprise an elongate, non-perforated outer cover. Optionally, the at least four collector conduits each comprise an elongate perforated outer cover.

Preferably, the elongate outer cover comprises a polymer.

Preferably, the collector conduits have an aspect ratio of width to height of more than 10:1. More preferably, the aspect ratio is more than 20:1. Indeed, even an aspect ratio of more than 50:1 can be achieved.

The system is similar to a surficial gas collection system in that it also works with the landfill's continual gas generation and resulting internal positive pressures to push gas to the surface where it is trapped below an impermeable membrane. However, the present gas collection system is differentiated from all other gas collection methods by utilizing a sealed flat piping network with collection points (collection disks) below the membrane (final closure, interim) at locations determined by landfill gas generation modeling.

The system design, coupled with a membrane cover, creates a superior barrier and conveyance system for fugitive emissions. The radius of influence of the system can be every square foot between the waste mass and the atmosphere.

The system requires no drilling (wells), no trenching (buried piping), and no above-ground piping. It also produces no condensate, and allows for a significant reduction in effort in monitoring of collection points.

The system is a designed and manufactured solution that provides for an easy and quick installation of a gas collection system that requires reduced capital costs, lowered O&M costs, stability in gas collection management along with a significant reduction in condensate generation.

In another example form as shown in FIGS. 12-20B, the present invention relates to a low-profile subsurface fluid conveyance conduit and system 200. The fluid conveyance conduit and system 200 is in the general form of a grid and includes at least one high-volume, low-profile fluid trunk conduit. Further, the conduit and system 200 has a series of progressively sized components, with smaller conduits feeding into larger conduits. As more clearly shown in FIG. 12, the conduit and system 200 shown is depicted as being used on a landfill site in which the topography of the site is generally shaped like a hill, such that some of the components are at somewhat higher elevations than other components. The low-profile subsurface fluid conveyance conduit and system 200 is positioned below a geomembrane cover or cover system 250 which optionally is held firmly in place on the sloping hillside by anchor trenches 261, 262. Typically these anchor trenches 261, 262 would be filled in with soil or gravel to hold the geomembrane cover 250 more firmly in place.

Further, the low-profile subsurface fluid conveyance conduit and system 200 rests atop a lateral gas conveyance media 270. The lateral gas conveyance media 270 can take several forms, including gravel, rocks, geotextiles, etc. In one example form, the lateral gas conveyance media can be a three-dimensional structure with a generally flat upper portion and studs or protuberances extending downwardly below the flat upper portion, with the space inbetween the protuberances providing a fluid flow path for gas. The lateral gas conveyance media 270 provides a flow path for delivering gas to the low-profile subsurface fluid conveyance conduit and system 200 over extended distances. The lateral gas conveyance media 270 can comprise a generally continuous field of media stretching more or less uniformly in all lateral directions. In other forms, the lateral gas conveyance media 270 can comprise a series generally discrete channels or strips of media stretching more or less in specific lateral directions, forming defined pathways for the gas to flow therealong and be collected by other equipment. For example, as shown in example form in FIG. 15, the lateral gas conveyance media 270 can comprise lateral strips 271, 273, 275, crossing and intersecting with transverse strips 272, 274. These strips can be positioned at convenient distances apart. In a typical landfill application, they can be on the order of a 200 foot by 200 foot grid spacing (lateral strips spaced 200 feet from one another and transverse strips spaced 200 feet from one another as well).

Figure 13:
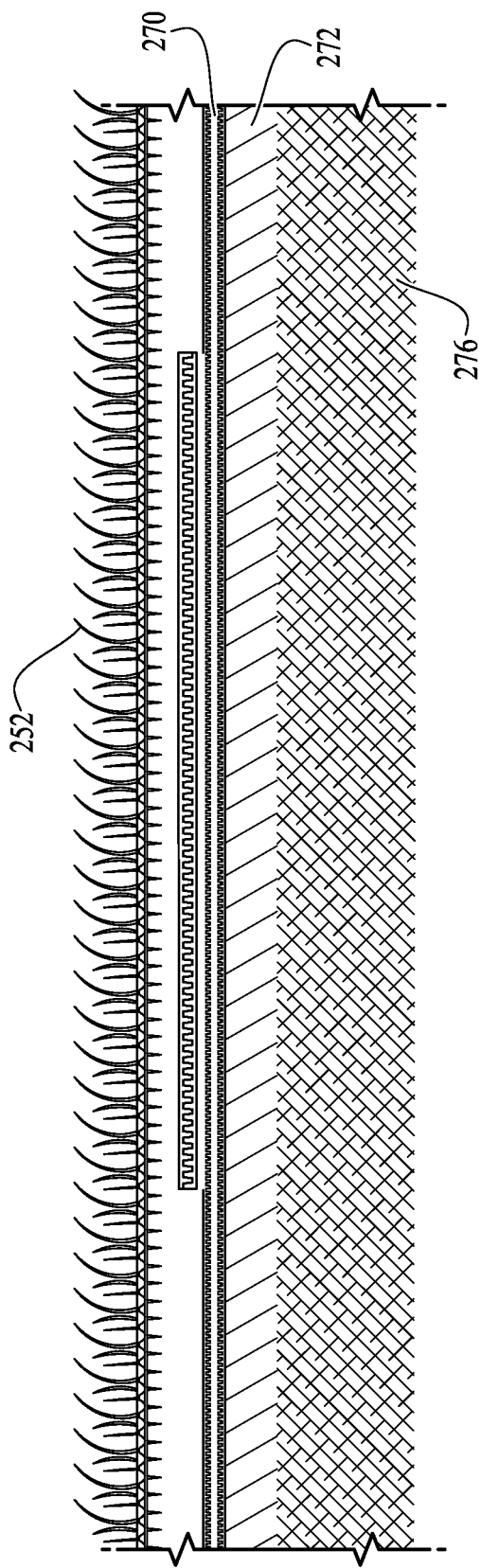
FIG. 13 is a schematic, sectional view of a first portion of the low-profile fluid collection conduit and system of FIG. 12 for extracting and/or conveying sub-surface gas from a waste landfill according to a preferred example form of the present invention.
Figure 14:
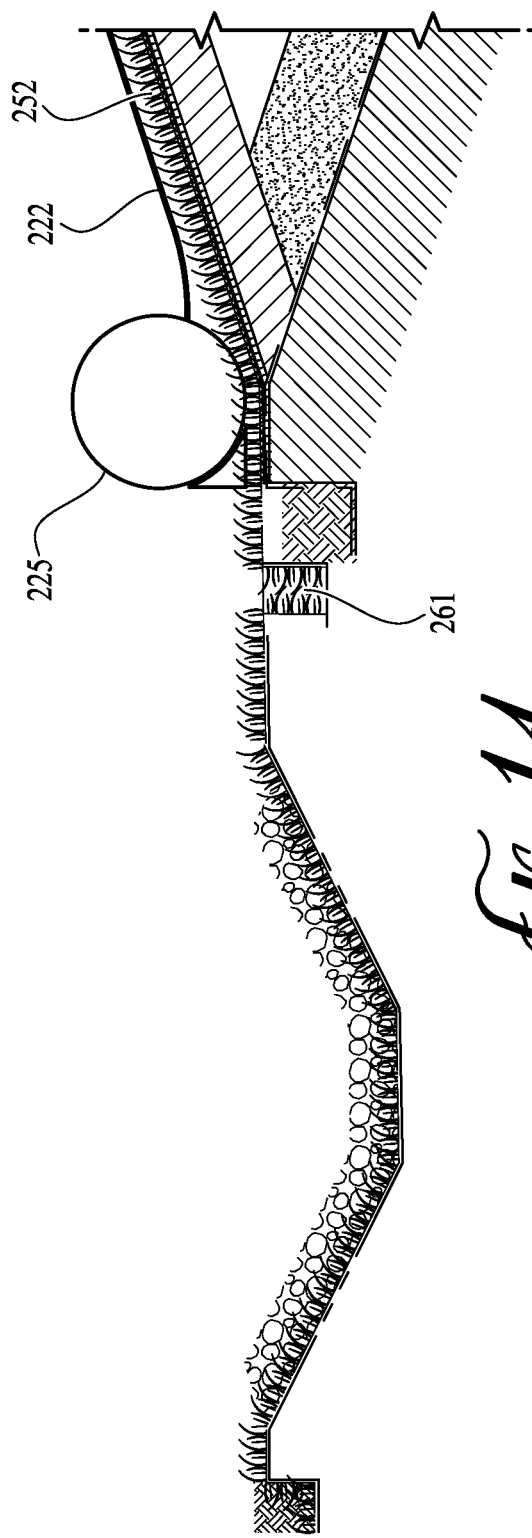
FIG. 14 is a schematic, sectional view of another portion of the low-profile fluid collection conduit and system of FIG. 12 for extracting and/or conveying sub-surface gas from a waste landfill according to a preferred example form of the present invention.

As shown in FIG. 13, the lateral gas conveyance media 270 can be placed atop a prepared subgrade layer 272 (typically a prepared soil) which in turn is atop a gas transmission media layer 276 (typically gravel or crushed stone). The lower gas transmission media layer 276 facilitates the upward movement of gas from the contents of the landfill toward the surface, while the lateral gas conveyance media 270 tends to promote lateral movement of the landfill gas to enable it to be collected conveniently.

Figure 12:
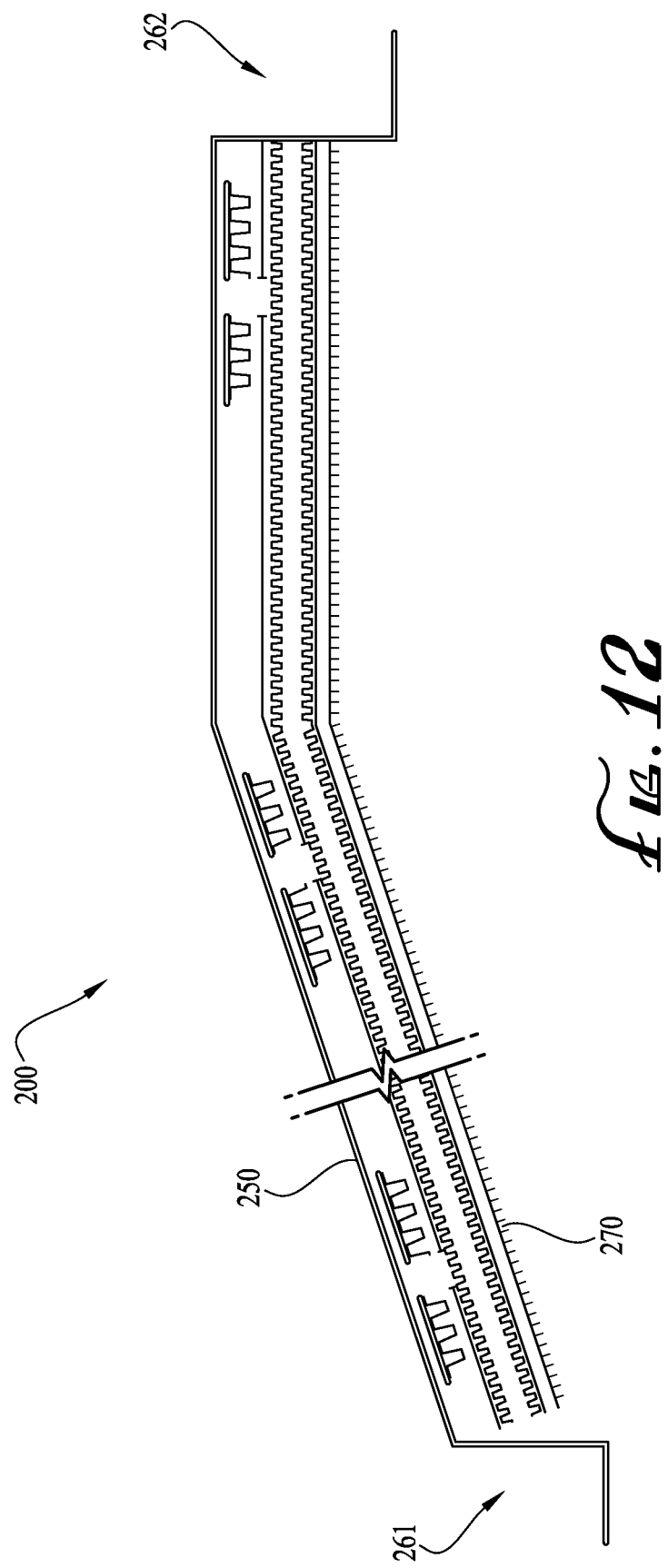
FIG. 12 is a schematic, sectional view of a low-profile fluid collection conduit and system for extracting and/or conveying sub-surface gas from a waste landfill according to another preferred example form of the present invention.

FIG. 12 depicts a low-profile subsurface fluid conveyance conduit and system 200 topped with a geomembrane cover system 250. Optionally, as shown in FIG. 13, the geomembrane cover system 250 can comprise a synthetic turf covering 252. Alternatively, the geomembrane cover system 250 can comprise a simple membrane covering.

Figure 15:
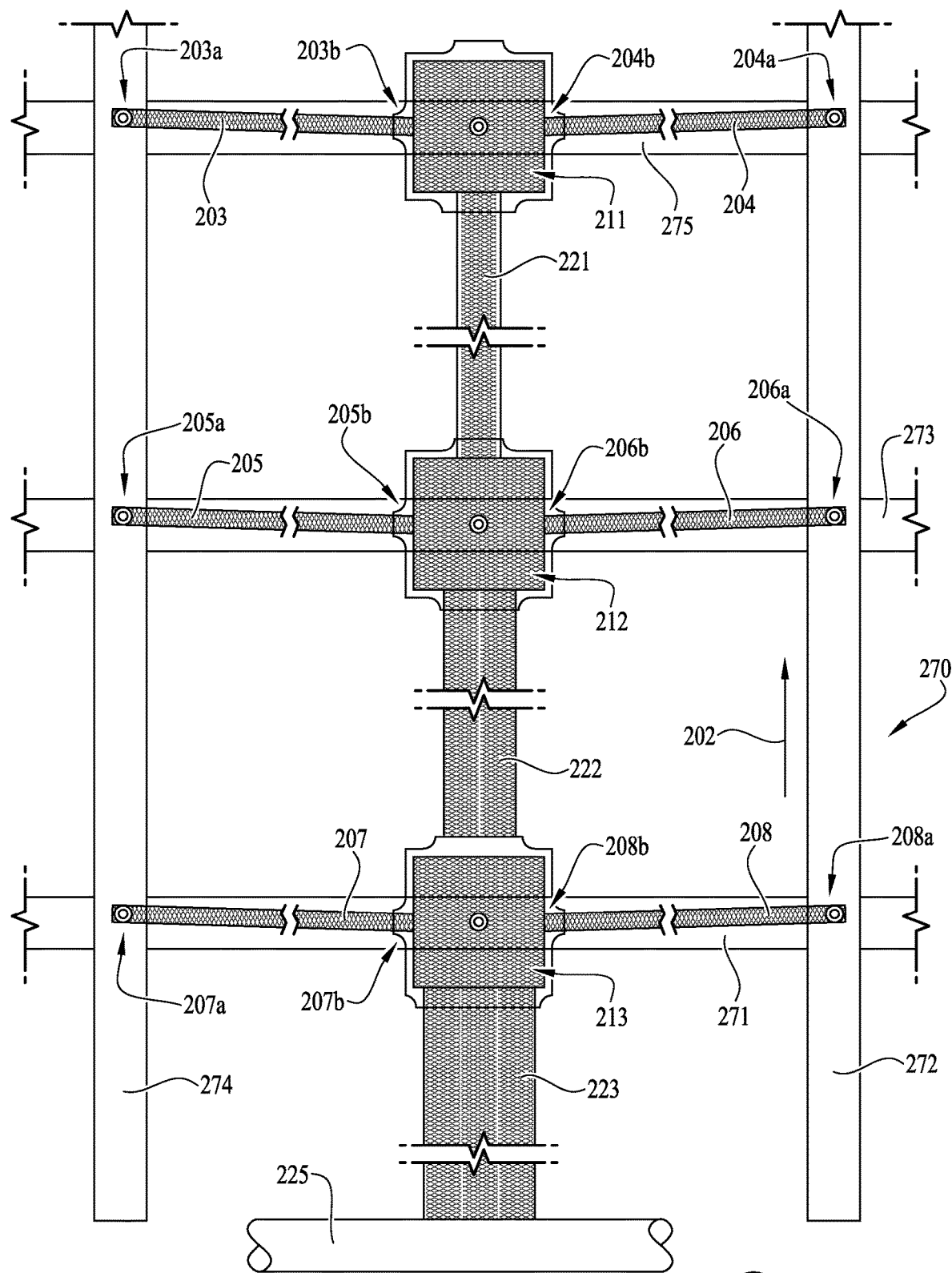
FIG. 15 is a schematic, sectional view of a low-profile fluid collection conduit and system of FIG. 12 for extracting and/or conveying sub-surface gas from a waste landfill and depicting such a system installed over a large area on sloping ground.

Referring now to FIG. 15, the low-profile subsurface fluid conveyance conduit and system 200 includes a plurality of lower-volume, low-profile collector conduits 203-208 connected to and feeding into junctions or Tees 211, 212, 213. These conduits 203-208 can be quite lengthy—indeed, in a typical landfill application these conduits typically can be on the order of 200 feet long or more. The lower-volume collector conduits 203-208 can all be of the same flow capacity (cross-sectional area) or can be of various capacities. The first Tee 211 collects from two lower-volume collector conduits 203, 204. The first Tee 211 feeds into a first outlet conduit 221 leading to a second Tee 212. The second Tee 212 collects from a second pair of lower-volume collector conduits 205, 206 along with collecting from the first outlet conduit 221. Thus, the second Tee 212 is collecting from four lower volume conduits 203-206 (directly or indirectly).

A medium-volume, low-profile fluid outlet conduit 222 is connected to the second Tee 212 and feeds into a third Tee 213. Tee 213 also collects from two lower-volume collector conduits 207, 208. Thus, the third Tee 213 is collecting from six lower volume conduits 203-208 (directly or indirectly) and is sized accordingly. Third Tee 213 outputs the collected volume to a larger volume (but still low-profile) trunk conduit 223. Thus, the conduits 221, 222, 223 are progressively larger (progressively greater flow capacity).

With this construction, surficial fluid can be drawn into the smaller collector conduits 203-208, gathered into the increasingly larger branch conduits 221-223. Large trunk conduit 223 is connected to and outputs its fluid to a gas collection header 225. Optionally, this gas collection header 225 can be above ground, while the remainder of the low-profile subsurface fluid conveyance conduit and system 200 can be positioned beneath the surface of the ground. Or, this gas collection header 225 can be below ground, with the remainder of the low-profile subsurface fluid conveyance conduit and system 200.

In the example shown in FIG. 15, the Tee 211 is about 2 feet by 2 feet, the Tee 212 is about 2 feet by 4 feet, and the Tee 213 is about 4 feet by 6 feet. The lower volume conduits 203-208 are about one foot wide by 200 feet long. The branch conduit 221 is about 2.5 feet wide and 200 feet long, branch conduit 222 is about 4.5 feet wide and 200 feet long, and branch conduit 223 is about 6.5 feet wide and 200 feet long. As seen in this figure, the system 200 is installed on an upslope (hillside), with the direction of the upslope indicated by direction arrow 202.

When the low-profile subsurface fluid conveyance conduit and system 200 is positioned beneath the surface of sloping ground, as depicted in FIG. 15, it can be helpful to orient the lower volume conduits 203-208 such that the distal ends thereof (203a-208a) are positioned slightly higher than the proximal ends 203b-208b to allow any liquid present therein to flow downhill and into the collection Tees 211, 212, 213. In one example form, the lower volume conduits 203-208 are about 200 feet long and the distal ends 203a-208a are about a foot higher than the proximal ends 203b-208b.

Figure 16:
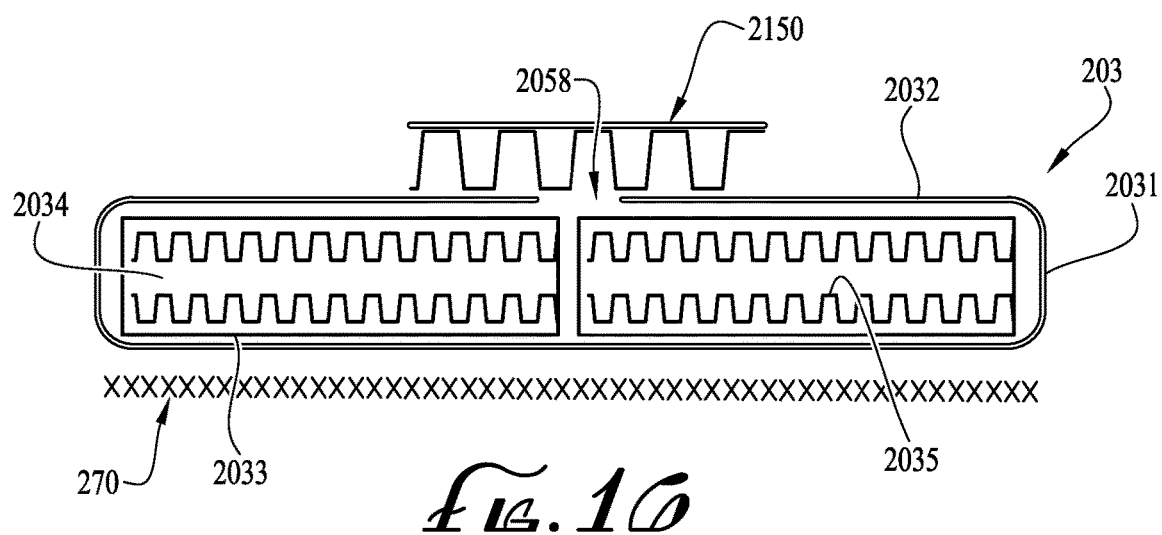
FIG. 16 is a schematic, sectional view of a low-profile fluid collection conduit of FIG. 15 for extracting and/or conveying sub-surface gas from a waste landfill according to another preferred example form of the present invention.
Figure 17A:
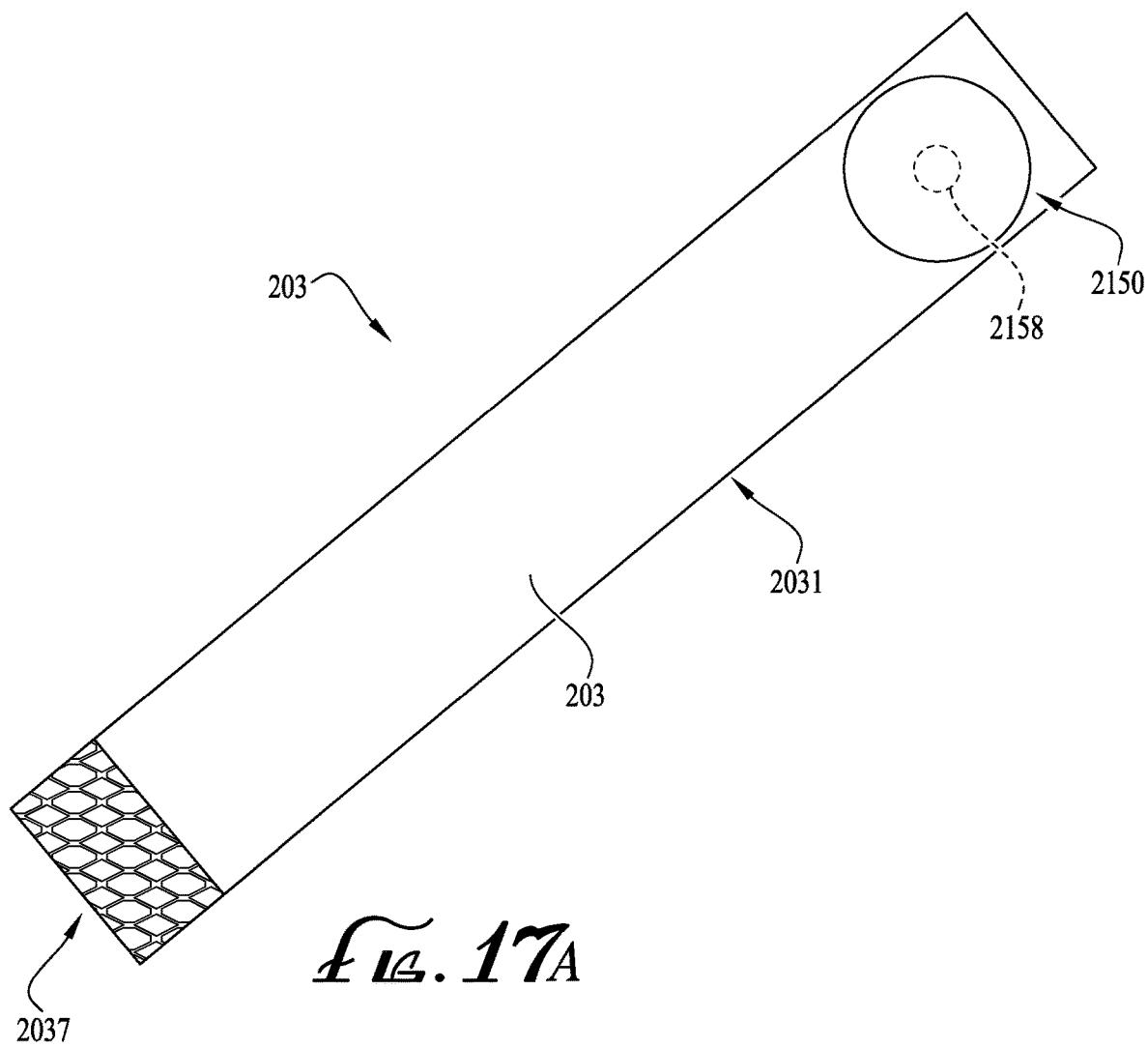
FIG. 17A is a schematic, sectional view of a first low-profile fluid collection conduit and system of FIG. 15 for extracting and/or conveying sub-surface gas from a waste landfill according to a preferred example form of the present invention.

The lower volume conduits 203-208 and the collector conduits 221-223 each include an elongate outer cover having an upper portion and a lower portion generally opposite the upper portion, with the outer cover being much wider than it is tall and defining an interior volume and including an elongate rigid spacer fitted within the interior volume of the elongate outer cover, the elongate spacer allowing the majority of the interior volume to be unfilled so as to permit the flow of fluid along and within the elongate outer cover. For example, as shown in FIG. 16, the lower volume conduit 203 includes an elongate outer cover 2031 having an upper portion 2032 and a lower portion 2033 generally opposite the upper portion 2032, with the outer cover 2031 being much wider than it is tall and defining an interior volume 2034 and including an elongate rigid spacer 2035 fitted within the interior volume 2034 of the elongate outer cover 2031, the elongate spacer 2035 allowing the majority of the interior volume 2034 to be unfilled so as to permit the flow of fluid along and within the elongate outer cover 2031. The lower volume conduit 203 is fitted with a gas collection disk 2150 thereupon positioned over a gas aperture 2058. As depicted rather schematically, the length of the conduit 203 can be on the order of 200 feet, while the width of the conduit 203 would typically be on the order of 1 foot. The collection disk 2150 is a low profile, high gas flow capacity structure. The collection disk 2150 is generally a 4 inch (round or square) diameter and is placed over the collection orifice 2158 to ensure gas flow into the system. As shown in FIG. 17A, preferably the lower volume conduit 203 includes a transition portion 2037 at one end thereof for insertion into a Tee. The transition portion 2037 is similar to the rest of the lower volume conduit 203 but with the outer wrapping or elongate outer cover 2031 omitted at the transition.

Figure 17B:
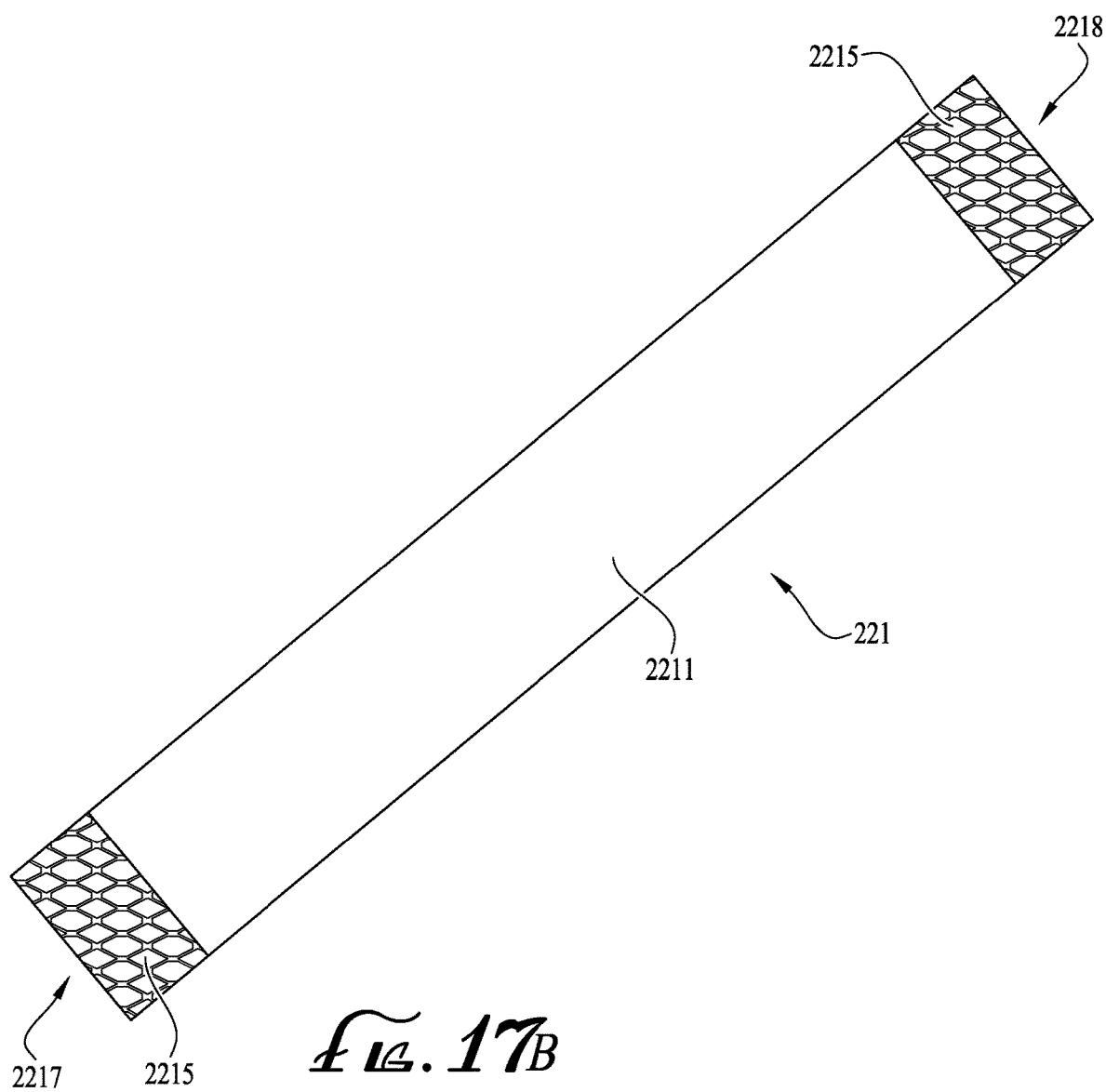
FIG. 17B is a schematic, sectional view of a second low-profile fluid collection conduit and system of FIG. 15 for extracting and/or conveying sub-surface gas from a waste landfill according to a preferred example form of the present invention.

As shown in FIG. 17B, the outlet conduits 221-223 are similar in general construction to the lower volume collector conduits 203-208. For example, as depicted in this example figure showing conduit 221, the outlet conduit includes an elongate outer cover 2211 having an upper portion and a lower portion (unshown in this figure) generally opposite the upper portion, with the outer cover 2211 being much wider than it is tall and defining an interior volume and including an elongate rigid spacer 2215 fitted within the interior volume of the elongate outer cover 2211, the elongate spacer allowing the majority of the interior volume to be unfilled so as to permit the flow of fluid along and within the elongate outer cover. As depicted rather schematically, the length of the conduit 221 can be on the order of 200 feet, while the width of the conduit 221 would typically be on the order of 2, 4, 6, or 8 feet. Preferably the outlet conduit 221 includes a first transition portion 2217 at one end thereof for insertion into a Tee and a second transition portion 2218 at an opposite end thereof for insertion into another Tee. The transition portions are similar to the rest of the conduit but with the outer wrapping or elongate outer cover omitted at the transitions to facilitate insertion into Tees.

Figure 18:
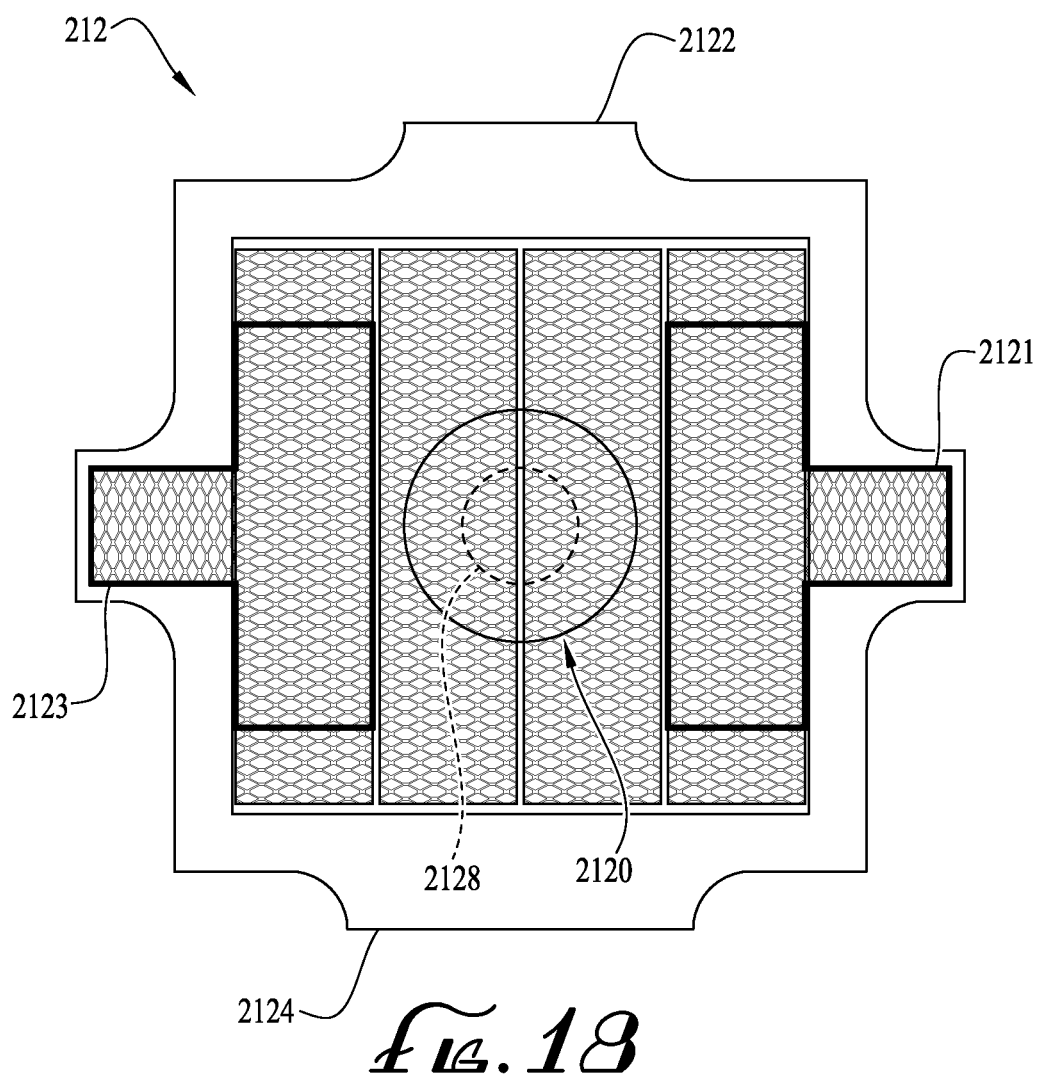
FIG. 18 is a schematic plan view of a reducer Tee of the low-profile fluid collection conduit and system of FIG. 15.
Figure 19:
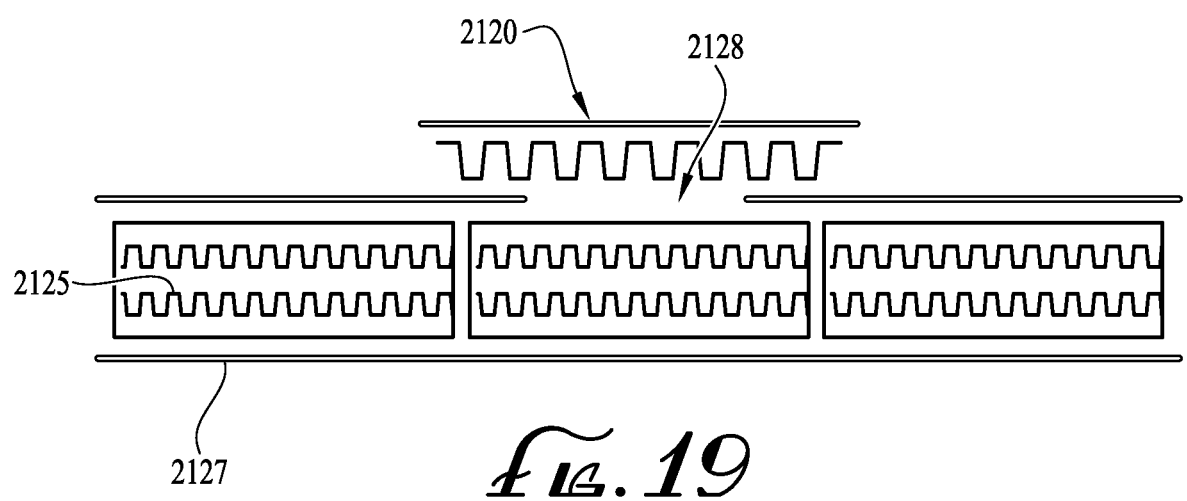
FIG. 19 is a sectional view of the reducer Tee of FIG. 18.

FIG. 18 and FIG. 19 show (in plan and sectional views, respectively) a typical Tee, such as Tee 212. The Tee 212 includes inlets 2121, 2122, 2123, 2124. Inlets 2121 and 2123 are provided for receiving lower volume conduits, such as lower volume conduits 205, 206 (see FIG. 15). Meanwhile, inlets 2122 and 2124 are provided for receiving inlet conduit 221 and outlet conduit 222, respectively (see FIG. 15). The Tee 212 can be provided with a gas orifice 2128 (to admit gas) and a gas collection disk 2120 covering the orifice. As with the conduits, the Tee 212 can be constructed with a relatively thin covering or shell 2127 and one or more rigid spacers 2125 fitted within the interior volume of Tee and sandwiched between upper and lower parts of the shell 2127.

FIG. 20A and FIG. 20B show (in side and end sectional views, respectively) a typical Tee, such as Tee 212. The Tee 212 includes inlets 2121, 2122, 2123, 2124. Inlets 2121 and 2123 are provided for receiving lower volume conduits, such as lower volume conduits 205, 206 (see FIG. 15). Meanwhile, inlets 2122 and 2124 are provided for receiving inlet conduit 221 and outlet conduit 222, respectively (see FIG. 15). The Tee 212 can be provided with a gas orifice 2128 (to admit gas) and a gas collection disk 2120 covering the orifice. As with the conduits, the Tee 212 can be constructed with a relatively thin covering or shell 2127 and one or more rigid spacers 2125 fitted within the interior volume of Tee and sandwiched between upper and lower parts of the shell 2127.

FIG. 20A is a schematic, side sectional view of a transitional connector 240 for connecting the low-profile fluid collection conduit and system 270 of FIG. 15 to a main header 225, while FIG. 20B is a schematic, end sectional view of the transitional connector 240. As with the conduits and the Tees, the transitional connector 240 can be constructed with a relatively thin covering or shell 247 and one or more rigid spacers 245 fitted within the interior volume of transitional connector 240 and sandwiched between upper and lower parts 2471, 2472 of the shell 247. The shell 247 can be PVC or other materials, as desired. The spacer 245 can be a commercially available product known in the marketplace as "JDrain", made and/or sold by JDR Enterprises of Alpharetta, Ga. 30009. The transitional connector 240 can be fitted about a pipe 260, which can be of various constructions. In one example form, the pipe 260 is made of polyethylene and has an inside diameter of about 2 inches. A drain hole 261 can be provided in the pipe 260 to weep away moisture. The pipe 260 is connected to a control valve 265 for controlling flow from the pipe 260 to the main header pipe/main header conduit 225. As shown in FIG. 20A, the transitional connector 240 can be used at the interface or surface S of the landfill separating the subsurface material and equipment from atmosphere.

It is to be understood that this invention is not limited to the specific devices, methods, conditions, or parameters described and/or shown herein, and that the terminology used herein is for the purpose of describing particular embodiments by way of example only. Thus, the terminology is intended to be broadly construed and is not intended to be limiting of the claimed invention. For example, as used in the specification including the appended claims, the singular forms "a," "an," and "one" include the plural, the term "or" means "and/or," and reference to a particular numerical value includes at least that particular value, unless the context clearly dictates otherwise. In addition, any methods described herein are not intended to be limited to the sequence of steps described but can be carried out in other sequences, unless expressly stated otherwise herein.

While the invention has been shown and described in exemplary forms, it will be apparent to those skilled in the art that many modifications, additions, and deletions can be made therein without departing from the spirit and scope of the invention as defined by the following claims.

What is claimed is:

1. A low-profile subsurface fluid conveyance conduit grid, comprising:
    at least one high-volume, low-profile fluid trunk conduit;
    at least two medium-volume, low-profile fluid branch conduits connected to and feeding into the at least one high-volume, low profile trunk conduit; and
    at least four lower-volume, low-profile collector conduits connected to and feeding into the at least two medium-volume, low profile branch conduits, with each branch conduit being connected to at least two of the collector conduits, wherein surficial fluid can be drawn into the smaller collector conduits, gathered into the somewhat larger branch conduits, and finally into the trunk conduit, and gas collection strips positioned under at least some of the conduits;

and wherein at least one of the trunk conduit, the branch conduits, and the collector conduits comprise an elongate outer cover having an upper portion and a lower portion generally opposite the upper portion, with the outer cover being much wider than it is tall and defining an interior volume and including an elongate rigid spacer fitted within the interior volume of the elongate outer cover, the elongate spacer allowing the majority of the interior volume to be unfilled so as to permit the flow of fluid along and within the elongate outer cover.

2. A low-profile fluid collection conduit as claimed in claim 1, wherein the elongate outer cover is non-perforated.

3. A low-profile fluid collection conduit as claimed in claim 1, wherein the elongate outer cover is perforated.

4. A low-profile fluid collection conduit as claimed in claim 1, wherein the elongate outer cover is much thinner than it is tall and is flexible.

5. A low-profile fluid collection conduit as claimed in claim 1, wherein the elongate outer cover comprises a polymer.

6. A low-profile fluid collection conduit as claimed in claim 1 wherein the one or more rigid elongate spacers comprise an elongate sheet comprising a base and a series of projections extending from the base.

7. A low-profile fluid collection conduit as claimed in claim 6 wherein the projections comprise elongate projections extending within the outer cover and forming channels.

8. A low-profile fluid collection conduit as claimed in claim 6 wherein the wherein the projections comprise discrete, non-elongate projections in a grid pattern extending both laterally and longitudinally.

9. A low-profile fluid collection conduit as claimed in claim 8 wherein the wherein the discrete projections comprise generally conical projections.

10. A low-profile fluid collection conduit as claimed in claim 8 wherein the wherein the discrete projections comprise generally nub-like projections.

11. A low-profile subsurface fluid conveyance conduit grid as claimed in claim 1 wherein the gas collection strips are elongate and comprise an elongate sheet comprising a panel and a series of projections extending from the panel.

12. A low-profile subsurface fluid conveyance conduit grid as claimed in claim 1 wherein the fluid includes at least some water.

13. A low-profile subsurface fluid conveyance conduit grid as claimed in claim 1 wherein the fluid is surficial landfill gas.

14. A low-profile subsurface fluid conveyance conduit grid as claimed in claim 13 wherein the grid is adapted for use under the surface of a landfill, the grid further comprising an impermeable membrane positioned under the surface of the landfill and over the conduits.

15. A low-profile subsurface fluid conveyance conduit grid as claimed in claim 13 wherein the grid is substantially cruciform in shape and at intersections of various conduits an adapter T or cross is provided.

16. A low-profile subsurface fluid conveyance conduit grid as claimed in claim 15 wherein the adapter T or cross has an upper opening and is provided with a cover for covering the upper opening.

17. A low-profile subsurface fluid conveyance conduit grid as claimed in claim 1 wherein the at least one trunk conduit and the at least two branch conduits each comprise an elongate, non-perforated outer cover.

18. A low-profile subsurface fluid conveyance conduit grid as claimed in claim 1 wherein the at least four collector conduits each comprise an elongate perforated outer cover.

19. A low-profile subsurface fluid conveyance conduit grid as claimed in claim 17 wherein the elongate outer cover comprises a polymer.

20. A low-profile subsurface fluid conveyance conduit grid as claimed in claim 18 wherein the elongate outer cover comprises a polymer.

21. A low-profile subsurface fluid conveyance conduit grid as claimed in claim 1 wherein the collector conduits have an aspect ratio of width to height of more than 10:1.

22. A low-profile subsurface fluid conveyance conduit grid as claimed in claim 1 wherein the collector conduits have an aspect ratio of width to height of more than 20:1.

23. A low-profile subsurface fluid conveyance conduit grid as claimed in claim 1 wherein the collector conduits have an aspect ratio of width to height of more than 50:1.

24. A low-profile subsurface fluid conveyance conduit grid as claimed in claim 1 wherein the collector conduits have a height of between about ½ inch and about 3 inches.

25. A low-profile subsurface fluid conveyance conduit grid as claimed in claim 1 wherein the collector conduits have a height of about one inch.

* * * * *